(12) United States Patent
Esenlik et al.

(10) Patent No.: US 11,729,391 B2
(45) Date of Patent: Aug. 15, 2023

(54) ENCODER, A DECODER AND CORRESPONDING METHODS SIMPLIFYING SIGNALING SLICE HEADER SYNTAX ELEMENTS

(71) Applicant: Huawei Technologies Co., Ltd., Guangdong (CN)

(72) Inventors: Semih Esenlik, Munich (DE); Biao Wang, Munich (DE); Anand Meher Kotra, Munich (DE); Elena Alexandrovna Alshina, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/697,244

(22) Filed: Mar. 17, 2022

(65) Prior Publication Data

US 2022/0210422 A1 Jun. 30, 2022

Related U.S. Application Data

(63) Continuation of application No. PCT/CN2021/078382, filed on Mar. 1, 2021.

(30) Foreign Application Priority Data

Feb. 28, 2020 (WO) ................. PCT/EP2020/055341

(51) Int. Cl.
*H04N 11/02* (2006.01)
*H04N 19/129* (2014.01)
(Continued)

(52) U.S. Cl.
CPC ......... *H04N 19/129* (2014.11); *H04N 19/174* (2014.11); *H04N 19/176* (2014.11); *H04N 19/1883* (2014.11); *H04N 19/70* (2014.11)

(58) Field of Classification Search
CPC .................................................... H04N 19/129
(Continued)

(56) References Cited

U.S. PATENT DOCUMENTS

| 2012/0230428 A1* | 9/2012 | Segall | H04N 19/129 |
| | | | 375/240.25 |
| 2013/0076770 A1* | 3/2013 | Cheng | G09G 5/001 |
| | | | 345/547 |

(Continued)

FOREIGN PATENT DOCUMENTS

| CN | 103947207 A | 7/2014 |
| CN | 105472371 A | 4/2016 |

(Continued)

OTHER PUBLICATIONS

ITU-T H.264(Jun. 2019), Series H: Audiovisual and Multimedia Systems, Infrastructure of audiovisual services—Coding of moving video, Advanced video coding for generic audiovisual services, total 836 pages.

(Continued)

*Primary Examiner* — Leron Beck
(74) *Attorney, Agent, or Firm* — Womble Bond Dickinson (US) LLP

(57) ABSTRACT

A method of decoding of a picture from a video bitstream is disclosed. The video bitstream includes a slice header of a current slice and data representing the current slice. The method comprises: obtaining a parameter used to derive a number of tiles in the current slice from the slice header when a slice address of the current slice is not an address of a last tile in the picture where the current slice located; and reconstructing the current slice using the number of tiles in the current slice and the data representing the current slice.

15 Claims, 18 Drawing Sheets

(51) Int. Cl.
*H04N 19/174* (2014.01)
*H04N 19/176* (2014.01)
*H04N 19/169* (2014.01)
*H04N 19/70* (2014.01)

(58) Field of Classification Search
USPC .................................. 375/240.01–240.29
See application file for complete search history.

(56) References Cited

U.S. PATENT DOCUMENTS

| | | | | |
|---|---|---|---|---|
| 2014/0192899 | A1* | 7/2014 | Wang | H04N 19/44 375/240.26 |
| 2015/0023406 | A1* | 1/2015 | Lee | H04N 19/188 375/240.02 |
| 2015/0208095 | A1* | 7/2015 | Schierl | H04N 19/55 375/240.28 |
| 2016/0286235 | A1* | 9/2016 | Yamamoto | H04N 19/17 |
| 2020/0036968 | A1 | 1/2020 | Misra et al. | |

FOREIGN PATENT DOCUMENTS

| | | |
|---|---|---|
| CN | 108282655 A | 7/2018 |
| CN | 110035331 A | 7/2019 |
| CN | 110100442 A | 8/2019 |
| WO | 2020008103 A1 | 1/2020 |

OTHER PUBLICATIONS

ITU-T H.265(Feb. 2018), Series H: Audiovisual and Multimedia Systems Infrastructure of audiovisual services—Coding of moving video, High efficiency video coding, total 692 pages.

Document: JVET-Q2001-vB, Benjamin Bross et al., Versatile Video Coding (Draft 8), Joint Video Experts Team (JVET) of ITU-T SG 16 WP 3 and ISO/IEC JTC 1/SC 29/WG 11, 17th Meeting: Brussels, BE, Jan. 7-17, 2020, total 509 pages.

Document: JVET-Q2001-vD, Benjamin Bross et al, Versatile Video Coding (Draft 8), Joint Video Experts Team (JVET) of ITU-T SG 16 WP 3 and ISO/IEC JTC 1/SC 29/WG 11, 17th Meeting: Brussels, BE, Jan. 7-17, 2020, 509 pages.

Document: JVET-R02010_v2, Semih Esenliko et al, AHG9: Cleanup of Picture Header Syntax Structure in Slice Header, Joint Video Experts Team (JVET) of ITU-T SG 16 WP 3 and ISO/IEC JTC 1/SC 29/WG 11, 18th Meeting: by teleconference, AT, Apr. 15-24, 2020, 4 pages.

Document: JVET-S2001-v2, Benjamin Bross et al, Versatile Video Coding (Draft 10), Joint Video Experts Team (JVET) of ITU-T SG 16 WP 3 and ISO/IEC JTC 1/SC 29/WG 11, 19th Meeting: by teleconference, Jun. 22-Jul. 1, 2020, 529 pages.

* cited by examiner

FIG. 7

ENCODER, A DECODER AND CORRESPONDING METHODS SIMPLIFYING SIGNALING SLICE HEADER SYNTAX ELEMENTS

CROSS-REFERENCE TO RELATED APPLICATIONS

This patent application is a continuation of International Application No. PCT/CN2021/078382, filed on Mar. 1, 2021, which claims priority of international patent application PCT/EP2020/055341, filed on Feb. 28, 2020. The disclosures of the aforementioned applications are hereby incorporated by reference in their entireties.

TECHNICAL FIELD

Embodiments of the present application generally relate to the field of picture processing and more particularly to simplifying signaling slice header syntax elements.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever-increasing demands of higher video quality, improved compression and decompression techniques that improve compression ratio with little to no sacrifice in picture quality are desirable.

SUMMARY

Embodiments of the present disclosure provide apparatuses and methods for encoding and decoding according to the independent claims.

The present application provides:

A method of decoding of a picture from a video bitstream implemented by a decoding device, the bitstream including a slice header of a current slice and data representing the current slice, the method comprising: obtaining a parameter (for example, um_tiles_in_slice_minus1) used to derive the number of tiles in the current slice from the slice header, in case that a condition is satisfied, wherein the condition comprises: the slice address (for example, slice_address) of the current slice is not the address of the last tile in the picture where the current slice located; reconstructing the current slice using the number of tiles in the current slice and the data representing the current slice.

In the method, as described above, the slice address of the current slice being the address of the last tile in the picture may comprise determining that the number of tiles in the picture minus the slice address of the current slice is equal to 1.

In the method, as described above, the slice address of the current slice not being the address of the last tile in the picture may comprise determining that the number of tiles in the picture (for example, NumTilesInPic) minus the slice address of the current slice is greater than 1.

Thus, according to the present application the presence of the picture header structure in the slice header may be used to control the presence of the slice address and the number of tiles in the slice indications. If there is a single slice in a picture the slice address should be equal to the first tile in the picture and the number of tiles in the slice should be equal to the number of tiles in the picture. This may thus enhance compression efficiency.

In the method as described above, the value of the parameter of the current slice may be inferred to be equal to a default value when the condition is not satisfied.

In the method as described above, the default value may be equal to 0.

In the method as described above, the slice address may be in unit of tile.

In the method as described above, the condition may further comprise: determining that the current slice is in raster-scan mode.

In the method as described above, reconstructing the current slice using the number of tiles in the current slice may comprise: determining a scan order of the coding tree units in the current slice using the number of tiles in the current slice; and reconstructing the coding tree units in the current slice using the scan order.

The present application further provides a method for encoding of a video bitstream implemented by an encoding device, the bitstream including a slice header of a current slice and data representing the current slice, the method comprising: encoding a parameter used to derive the number of tiles in the current slice from the slice header, in case that a condition is satisfied, wherein the condition comprises: the slice address of the current slice is not the address of the last tile in the picture where the current slice located; reconstructing the current slice using the number of tiles in the current slice and the data representing the current slice.

The present application further provides an apparatus for decoding a picture from a video bitstream, the bitstream including a slice header of a current slice and data representing the current slice, the apparatus comprising: an obtaining unit configured to obtain a parameter used to derive the number of tiles in the current slice from the slice header, in case that a condition is satisfied, wherein the condition comprises: the slice address of the current slice is not the address of the last tile in the picture where the current slice located; a reconstructing unit configured to reconstruct the current slice using the number of tiles in the current slice and the data representing the current slice The present application further provides an apparatus for encoding of a coded video bitstream, the bitstream including a slice header of a current slice and data representing the current slice, the apparatus comprising: an encoding unit configured to encode a parameter used to derive the number of tiles in the current slice from the slice header, in case that a condition is satisfied, wherein the condition comprises: the slice address of the current slice is not the address of the last tile in the picture where the current slice located; a reconstructing unit configured to reconstruct the current slice using the number of tiles in the current slice and the data representing the current slice.

The present application further provides an encoder comprising processing circuitry for carrying out the method for encoding of a video bitstream as described above.

The present application further provides a decoder comprising processing circuitry for carrying out the method for decoding of a video bitstream as described above.

The present application further provides a computer program product comprising program code for performing the method for encoding a video bitstream as described above or the method for decoding a video bitstream as described above, when executed on a computer or a processor, respectively.

The present application further provides a decoder, comprising: one or more processors; and a non-transitory computer-readable storage medium coupled to the processors and storing programming for execution by the processors, wherein the programming, when executed by the processors, configures the decoder to carry out the method for decoding a video bitstream as described above.

The present application further provides an encoder, comprising: one or more processors; and a non-transitory computer-readable storage medium coupled to the processors and storing programming for execution by the processors, wherein the programming, when executed by the processors, configures the encoder to carry out the method for encoding a video bitstream as described above.

The present application further provides a non-transitory computer-readable medium carrying a program code which, when executed by a computer device, causes the computer device to perform the method for encoding a video bitstream as described above or the method for decoding a video bitstream as described above.

The present application further provides anon-transitory storage medium which includes a video bitstream, the bitstream including a slice header of a current slice and data representing the current slice, wherein the slice header comprises a slice address of the current slice; wherein in case that a condition is satisfied, the slice header further comprises a parameter used to derive the number of tiles in the current slice from the slice header, and the condition comprises: the slice address of the current slice is not the address of the last tile in the picture where the current slice located.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the application are described in more detail with reference to the attached figures and drawings, in which:

FIG. 7 is an example of raster scan order;

Figure 1A:
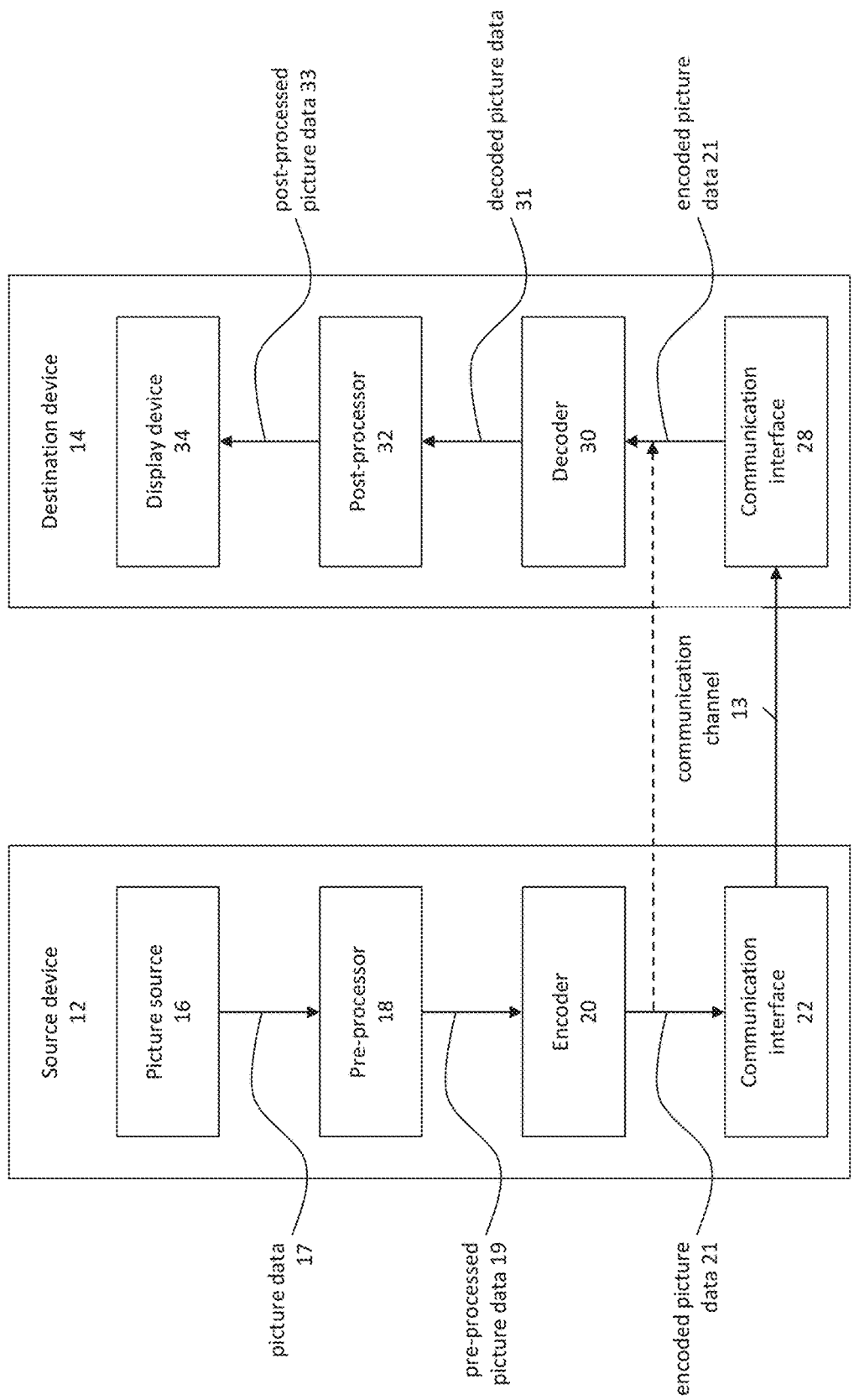
FIG. 1A is a block diagram showing an example of a video coding system according to an embodiment.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the application or specific aspects in which embodiments of the present application may be used. It is understood that embodiments of the application may be used in other aspects and comprise structural or logical changes not depicted in the figures. The following detailed description, therefore, is not to be taken in a limiting sense, and the scope of the present application is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is under- Video coding typically refers to the processing of a sequence of pictures, which form the video or video sequence. Instead of the term "picture", the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present disclosure. Video encoder 20 (or short encoder 20) and video decoder 30 (or short decoder 30) of video coding system 10 represent examples of devices that may be configured to perform techniques in accordance with various examples described in the present disclosure.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
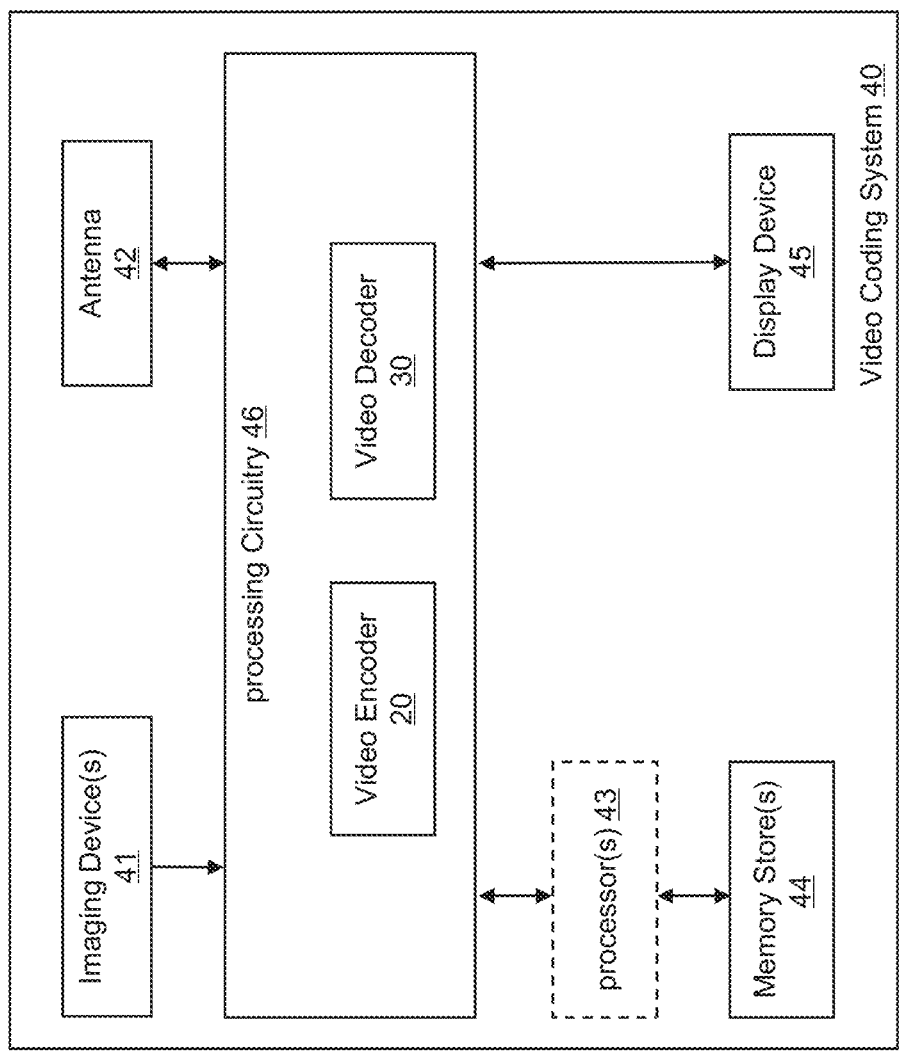
FIG. 1B is a block diagram showing another example of a video coding system according to an embodiment.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the application are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the application are not limited to HEVC or VVC.

Encoder and Encoding Method

Figure 2:
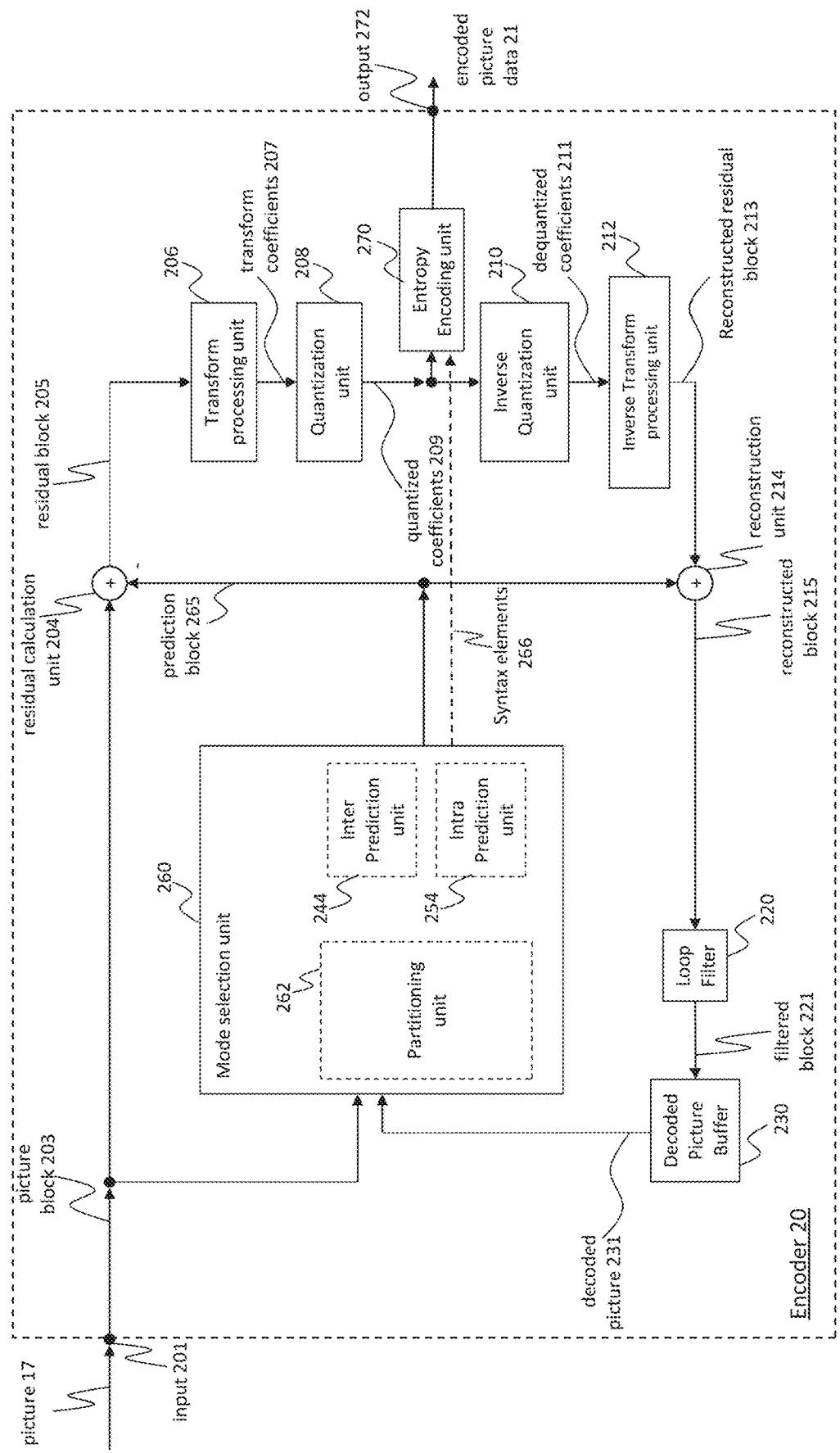
FIG. 2 is a block diagram showing an example of a video encoder according to an embodiment.

FIG. 2 shows a schematic block diagram of an example video encoder 20 that is configured to implement the techniques of the present disclosure. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
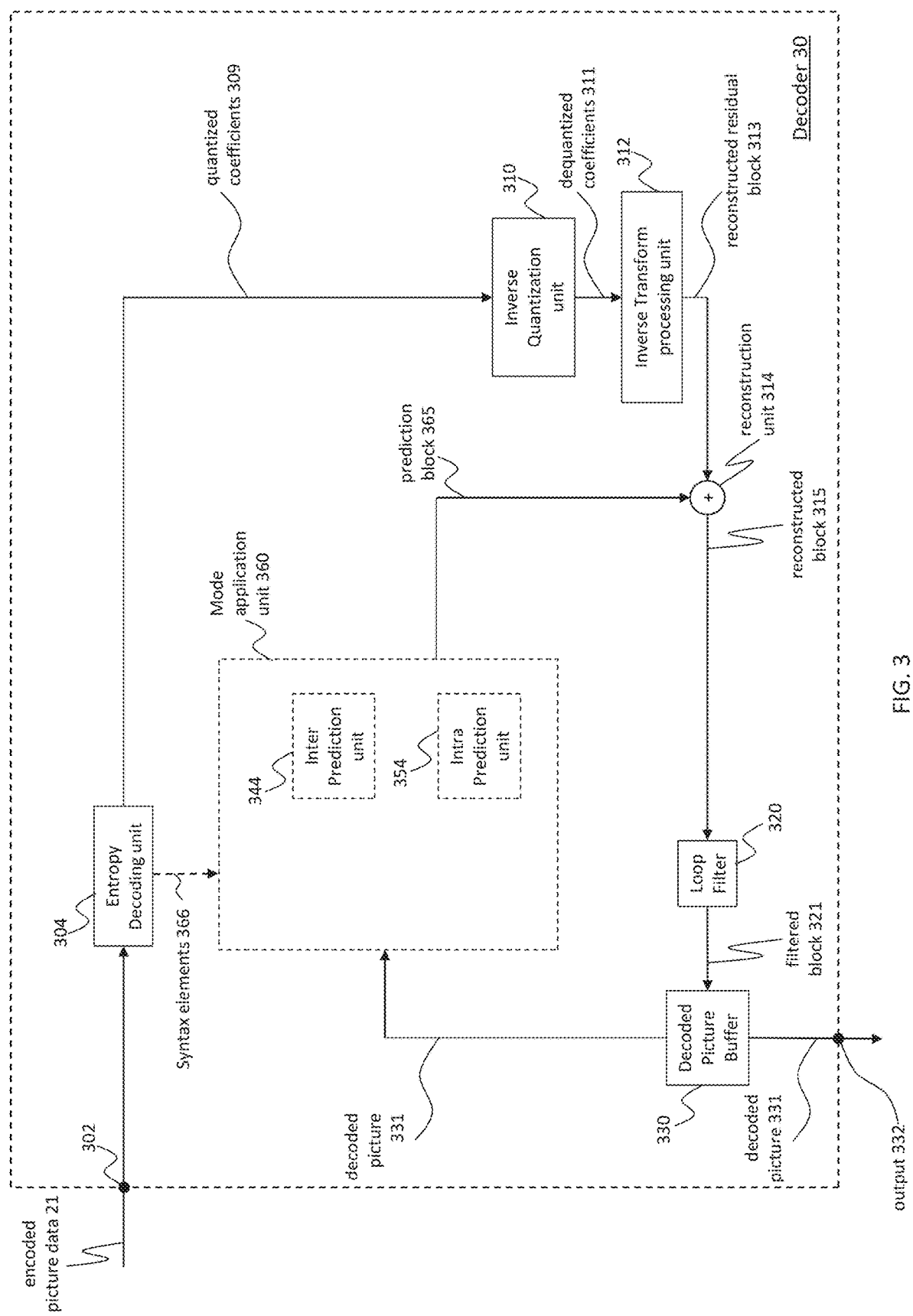
FIG. 3 is a block diagram showing an example structure of a video decoder according to an embodiment.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity, the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed-point approximation of an equation including division. Additional scaling factors may be introduced for quantization and dequantization to restore the norm of the residual block, which might be modified because of the scaling used in the fixed-point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode, which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to as tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks, which are not further partitioned, are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly, a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or a rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present disclosure. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: Remove the Overflow MSB (Most Significant Bit) by Flowing Operations $$ux = (mvx + 2^{bitDepth}) \% 2^{bitDepth} \quad (1)$$

$$mvx = (ux >= 2^{bitDepth-1}) ? (ux - 2^{bitDepth}):ux \quad (2)$$

$$uy = (mvy + 2^{bitDepth}) \% 2^{bitDepth} \quad (3)$$

$$mvy = (uy >= 2^{bitDepth-1}) ? (uy - 2^{bitDepth}):uy \quad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111,1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth}) \% 2^{bitDepth} \quad (5)$$

$$mvx = (ux >= 2^{bitDepth-1}) ? (ux - 2^{bitDepth}):ux \quad (6)$$

$$uy = (mvpy + mvdy + 2^{bitDepth}) \% 2^{bitDepth} \quad (7)$$

$$mvy = (uy >= 2^{bitDepth-1}) ? (uy - 2^{bitDepth}):uy \quad (8)$$

The operations may be applied during the sum of mvp and mvd, as shown in formula (5) to (8).

Method 2: Remove the Overflow MSB by Clipping the Value $$vx = \text{Clip3}(-2^{bitDepth-1}, 2^{bitDepth-1} - 1, vx)$$

$$vy = \text{Clip3}(-2^{bitDepth-1}, 2^{bitDepth-1} - 1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x; & z < x \\ y; & z > y \\ z; & \text{otherwise} \end{cases}$$

Figure 4:
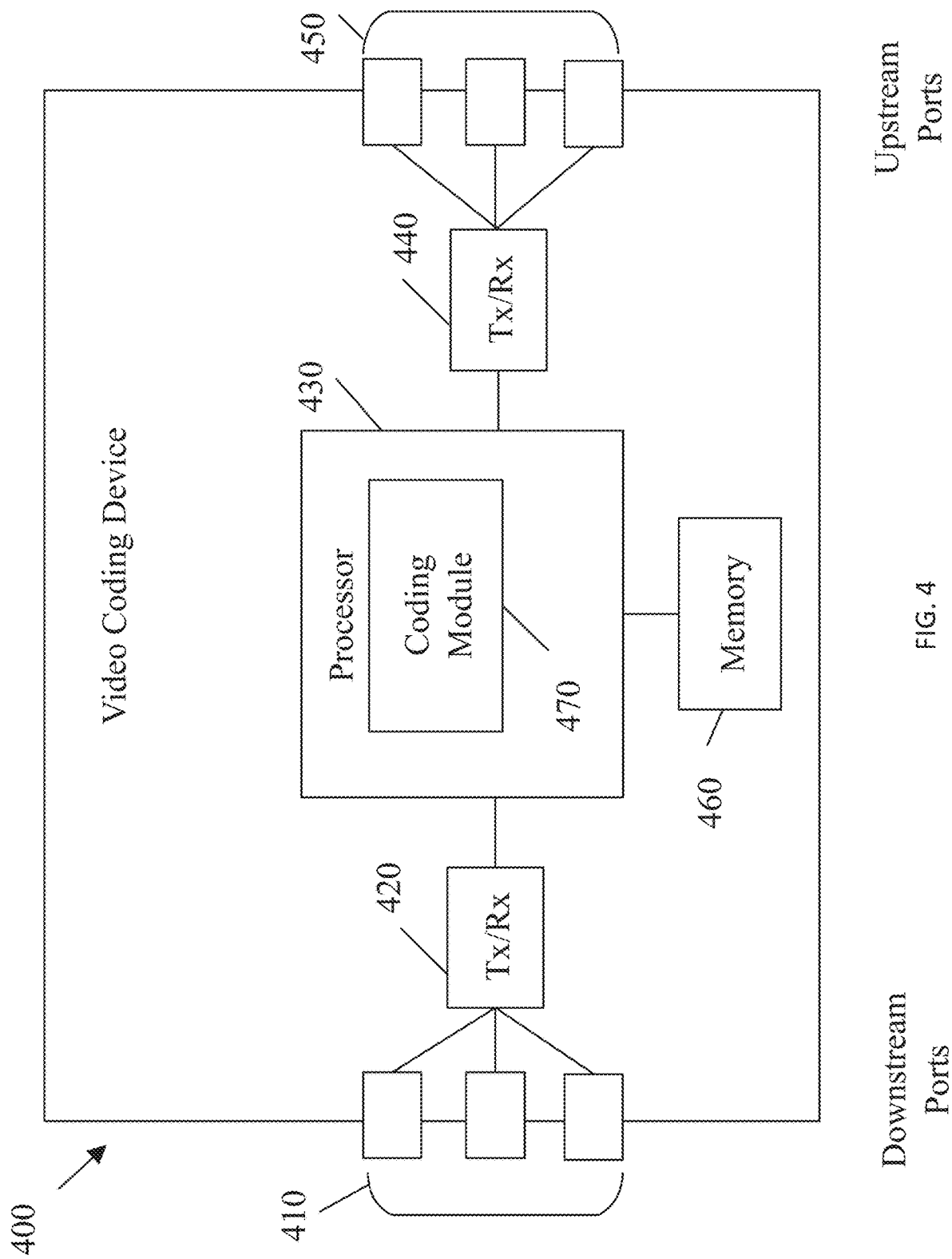
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
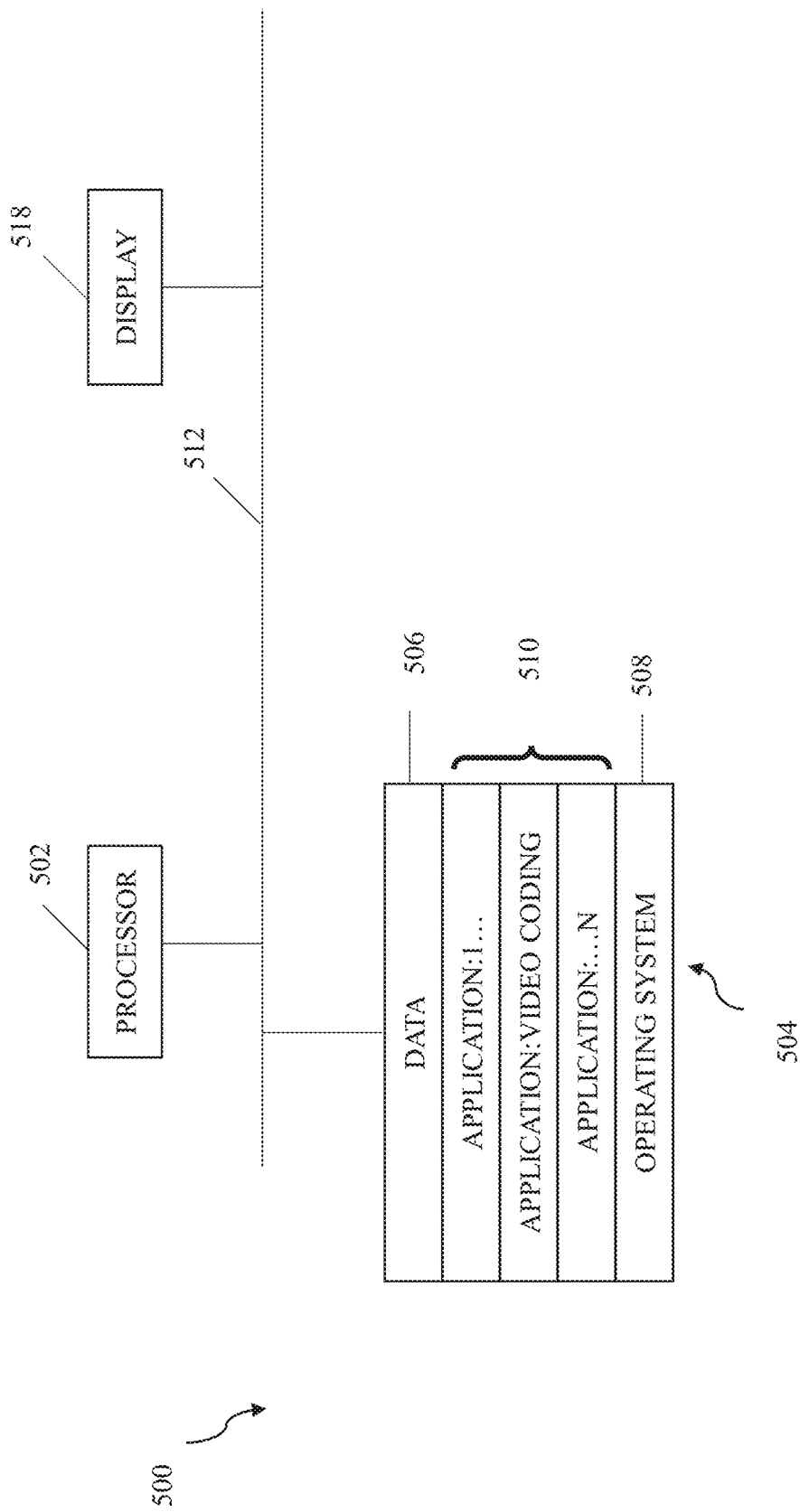
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Parameter Sets

Parameter sets are fundamentally similar and share the same basic design goals-namely bit rate efficiency, error resiliency, and providing systems layer interfaces. There is a hierarchy of parameter sets in HEVC (H.265), including the Video Parameter Set (VPS), Sequence Parameter Set (SPS) and Picture Parameter Set (PPS), which are similar to their counterparts in AVC and VVC. Each slice references a single active PPS, SPS and VPS to access information used for decoding the slice. The PPS contains information, which applies to all slices in a picture, and hence all slices in a picture must refer to the same PPS. The slices in different pictures are also allowed to refer to the same PPS. Similarly, the SPS contains information, which applies to all pictures in the same coded video sequence.

While the PPS may differ for separate pictures, it is common for many or all pictures in a coded video sequence to refer to the same PPS. Reusing parameter sets is bit rate efficient because it avoids the necessity to send shared information multiple times. It is also loss robust because it allows parameter set content to be carried by some more reliable external communication link or to be repeated frequently within the bitstream to ensure that it will not get lost.

Parameter Sets

Parameter sets are fundamentally similar and share the same basic design goals-namely bit rate efficiency, error resiliency, and providing systems layer interfaces. There is a hierarchy of parameter sets in HEVC (H.265), including the Video Parameter Set (VPS), Sequence Parameter Set (SPS) and Picture Parameter Set (PPS) which are similar to their counterparts in AVC and VVC. Each slice references a single active PPS, SPS and VPS to access information used for decoding the slice. The PPS contains information which applies to all slices in a picture, and hence all slices in a picture must refer to the same PPS. The slices in different pictures are also allowed to refer to the same PPS. Similarly, the SPS contains information which applies to all pictures in the same coded video sequence.

While the PPS may differ for separate pictures, it is common for many or all pictures in a coded video sequence to refer to the same PPS. Reusing parameter sets is bit rate efficient because it avoids the necessity to send shared information multiple times. It is also loss robust because it allows parameter set content to be carried by some more reliable external communication link or to be repeated frequently within the bitstream to ensure that it will not get lost.

The Sequence Parameter Set (SPS)

The SPS contains parameters that apply to one or more layers of a coded video sequence and do not change from picture to picture within a coded video sequence. In particular, the SPS including information that signaling of subpicture.

Some parts of the following table shows a snapshot of part of the subpicture signaling in SPS in ITU JVET-Q2001-v11, with the download link as follows:

http://phenix.it-sudparis.eu/jvet/doc_end_user/documents/17_Brussels/wg11/JVET-Q2001-v11.zip. In the remaining part of the application this prior art document will be named VVC draft 8 for simplicity.

subpic_height_minus1[i] indicating height of the subpicture i in the picture.

Some syntax elements indicate the number of subpictures inside the picture, e.g. sps_num_subpics_minus1.

A picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture. Consequently, each vertical slice boundary is always also a vertical tile boundary. It is possible that a horizontal boundary of a slice is not a tile

|  | Descriptor |
|---|---|
| seq_parameter_set_rbsp( ) { |  |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) |  |
|     profile_tier_level( 1, sps_max_sublayers_minus1 ) |  |
|   gdr_enabled_flag | u(1) |
|   chroma_format_idc | u(2) |
|   if( chroma_format_idc = = 3 ) |  |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag ) { |  |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } |  |
|   sps_log2_ctu_size_minus5 | u(2) |
|   subpic_info_present_flag | u(1) |
|   if( subpic_info_present_flag ) { |  |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) |  |
| { |  |
|       if( i > 0 && pic_width_max_in_luma_samples > CtbSizeY ) |  |
|         subpic_ctu_top_left_x[ i ] | u(v) |
|       if( i > 0 && pic_height_max_in_luma_samples > CtbSizeY ) { |  |
|         subpic_ctu_top_left_y[ i ] | u(v) |
|       if( i < sps_num_subpics_minus1 && |  |
|         pic_width_max_in_luma_samples > CtbSizeY ) |  |
|         subpic_width_minus1[ i ] | u(v) |
|       if( i < sps_num_subpics_minus1 && |  |
|         pic_height_max_in_luma_samples > CtbSizeY ) |  |
|         subpic_height_minus1[ i ] | u(v) |
|       if( !sps_independent_subpics_flag) { |  |
|         subpic_treated_as_pic_flag[ i ] | u(1) |
|         loop_filter_across_subpic_enabled_flag[ i ] | u(1) |
|       } |  |
|     } |  |
|   } |  |
| ... |  |
| ... |  |

Some syntax elements in SPS signal the position information and the control flags of each subpicture. The position information for the i-th subpicture includes:

subpic_ctu_top_left_x[i], indicating the horizontal component of the top-left coordinate of the subpicture i in the picture; or subpic_ctu_top_left_y[i] indicating the vertical component of the top-left coordinate of the subpicture i in the picture; or subpic_width_minus1[i] indicating width of the subpicture i in the picture; or boundary but consists of horizontal CTU boundaries within a tile; this occurs when a tile is split into multiple rectangular slices, each of which consists of an integer number of consecutive complete CTU rows within the tile.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture. Consequently, each subpicture boundary is also always a slice boundary, and each vertical subpicture boundary is always also a vertical tile boundary.

One or both of the following conditions shall be fulfilled for each subpicture and tile:

All CTUs in a subpicture belong to the same tile.
All CTUs in a tile belong to the same subpicture.

Partitioning of a Picture into CTUs, Slices, Tiles and Subpictures

Partitioning of the Picture into CTUs

Figure 6:
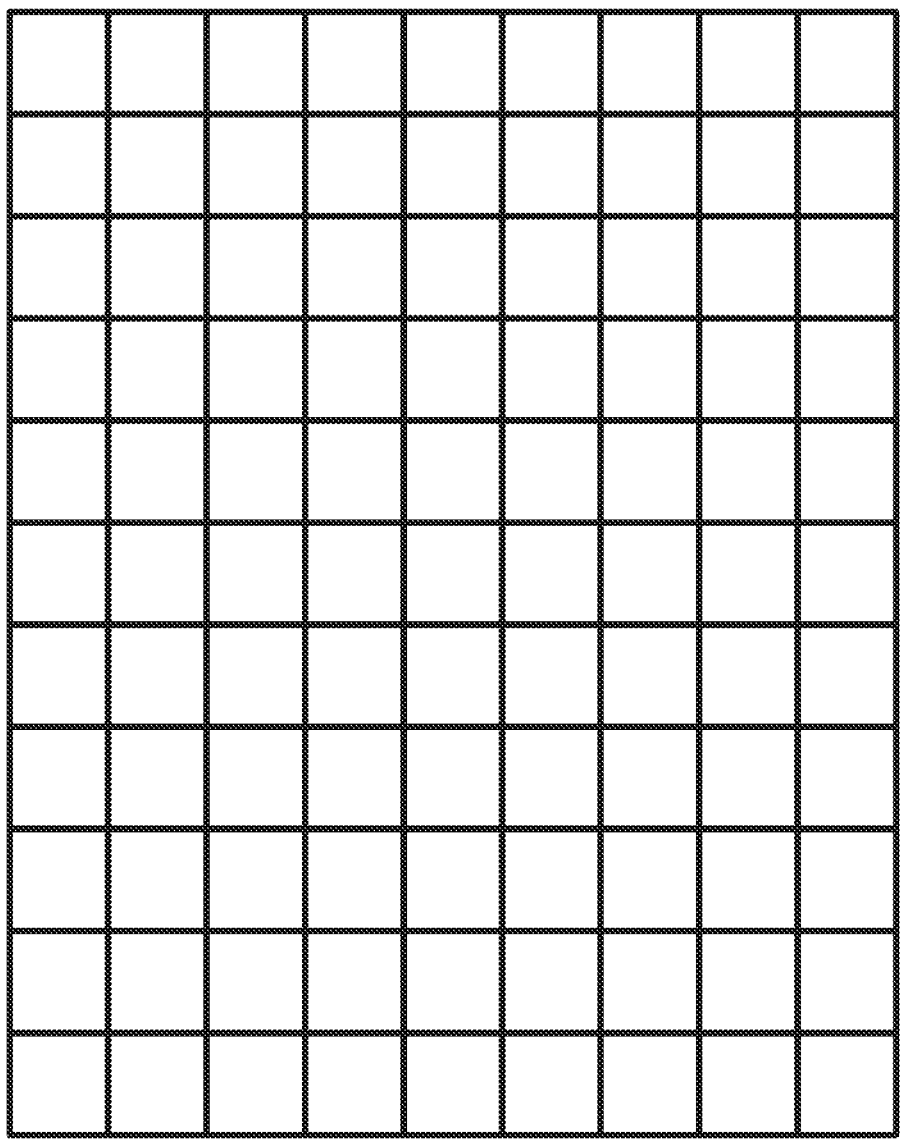
FIG. 6 illustrates an example of a picture divided into CTUs.

Pictures are divided into a sequence of coding tree units (CTUs). The terms CTB (coding tree block) is sometimes used interchangeably. The CTU concept is same to that of the HEVC. For a picture that has three sample arrays, a CTU consists of an N×N block of luma samples together with two corresponding blocks of chroma samples. FIG. 6 shows the example of a picture divided into CTUs. The size of the CTUs inside the frame must be same except for the ones at the picture boundaries (where incomplete CTUs can be present).

Partitioning of the Picture into Tiles

When tiles are enabled, picture is divided into rectangular-shaped groups of CTUs separated by vertical and/or horizontal boundaries. The vertical and horizontal tile boundaries intersect the picture from to bottom and from left picture boundary to right picture boundary respectively. In the bitstream, indications related to the position of the said horizontal and vertical tile boundaries are included.

Figure 7:
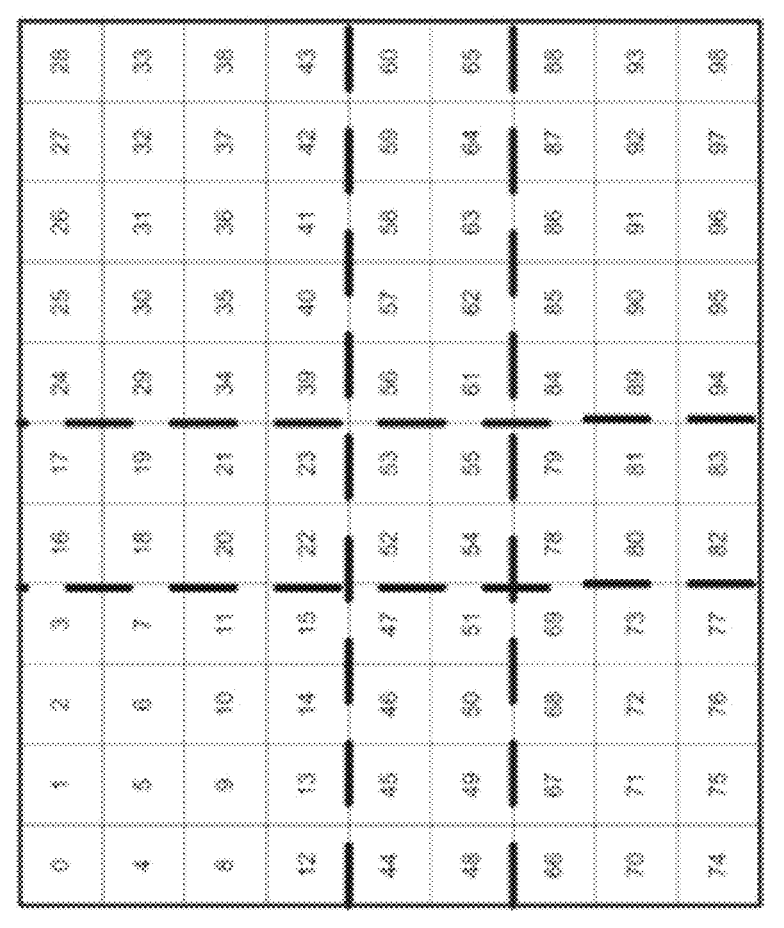

FIG. 7 exemplifies partitioning of a picture into 9 tiles. In the example, the tile boundaries are marked with bold dashed lines. In other words, FIG. 7 illustrates a tile-based raster scan order of CTUs with nine tiles of different sizes in the picture. Note that the tile boundaries are marked with bold dashed lines.

When there are more than 1 tiles inside a picture the scan order of the CTUs is changed. The CTUs are scanned according to the following rule:

1. Tiles are scanned from left to right and from top to bottom in raster scan order, which is called the tile scan order in this disclosure. This means that starting from the top-left tile, first all tiles are scanned that are in the same tile row from left to right. Then the starting with the first tile in the second tile row (the tile row that is one below), all tiles are scanned in the second tile row from left to right. The process is repeated until all tiles are scanned.

2. Inside a tile, CTUs are scanned in raster scan order. Inside a CTU row, CTUs are scanned from left to right and CTU rows are scanned from top to bottom. FIG. 7 exemplifies the scanning order of CTUs in the presence of tiles, the numbers inside the CTUs indicate the scanning order.

The tile concept provides a partitioning of a picture in such a way that each tile is independently decodable from other tiles of the same picture, where decoding refers to entropy, residual, and predictive decoding. Moreover, with tiles it is possible to partition the picture into similar sized regions. Therefore, it allows the possibility to process the tiles of a picture in parallel to each other, which is preferable for multi-core processing environments where each processing core is identical to each other.

The terms processing order and scanning order are used as follows in the disclosure:

Processing refers to encoding or decoding of CTUs in the encoder or decoder. Scanning order indicates the indexing of the particular partition inside a picture. CTU scan order in tile means how the CTUs inside a tile is indexed, which might not be the same order in which they are processed.

Partitioning of the Picture into Slices

The slice concept provides a partitioning of a picture in such a way that each slice is independently decodable from other slices of the same picture, where decoding refers to entropy, residual, and predictive decoding. The difference to tiles is that slices can have more arbitrary shapes (more flexible in partitioning possibilities), and the purpose of slice partitioning is not parallel processing but packet size matching in transmission environments and error resilience.

A slice may consist of a complete picture as well as parts thereof. In HEVC, a slice comprises multiple consecutive CTUs of a picture in processing order. The slice is identified by it is starting CTU address which is signaled in the slice header or picture parameter set or some other unit.

In the draft 8 of VVC, a slice comprises an integer number of complete tiles or an integer number of consecutive CTU rows within a tile of a picture. Consequently, each vertical slice boundary is always also a vertical tile boundary. It is possible that a horizontal boundary of a slice is not a tile boundary but comprises horizontal CTU boundaries within a tile; this occurs when a tile is split into multiple rectangular slices, each slice comprises an integer number of consecutive complete CTU rows within the tile.

In some examples, there are two slice modes, the raster-scan slice mode and the rectangular slice mode. In the raster-scan slice mode, a slice comprises a sequence of tiles in a tile raster scan of a picture. In the rectangular slice mode, a slice comprises a number of tiles that collectively form a rectangular region of the picture, or a slice comprises a number of consecutive CTU rows of one tile that collectively form a rectangular region of the picture. Tiles within a rectangular slice are scanned in tile raster scan order within the rectangular region corresponding to that slice.

All slices of a picture collectively form the entire picture, i.e. all CTUs of a picture must be included in one of the slices of a picture. Similar rules apply for tiles and subpictures.

Partitioning of the Picture into Subpictures

A subpicture rectangular partition of a picture. A subpicture can be the whole picture or a part of the picture. A subpicture is partitioning of a picture in such a way that each subpicture is independently decodable from other subpictures of the entire video sequence. In VVC draft 8, this is true when it is indicated in the bitstream. I.e. when subpic_treated_as_pic_flag[i] indication is true for subpicture i, that subpicture i is independently decodable from other subpictures of the entire video sequence.

The difference between the subpicture and tiles or slices is that, subpictures create an independently decodable video sequence inside a video sequence. Whereas for tiles and slices, independent decoding is guaranteed only inside a single picture of a video sequence.

In VVC draft 8, a subpicture comprises one or more slices that collectively cover a rectangular region of a picture. Consequently, each subpicture boundary is always a slice boundary, and each vertical subpicture boundary is always a vertical tile boundary.

Figure 8:
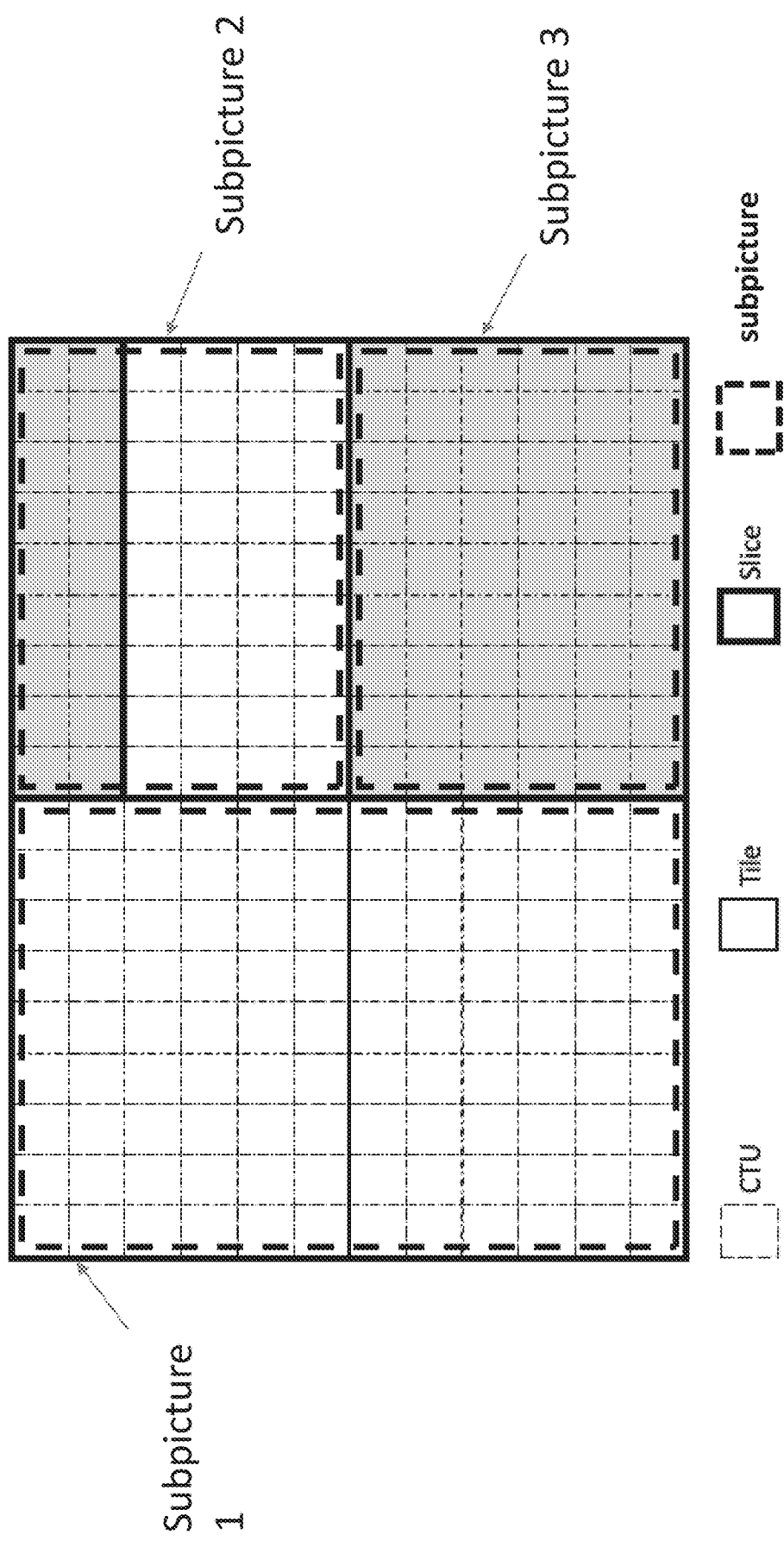
FIG. 8 is an example of tiles, slices and subpictures.

FIG. 8 provides an example of tiles, slices and subpictures. In other words, FIG. 8 illustrates an example of a picture containing 4 tiles, i.e. 2 tile columns and 2 tile rows, 4 rectangular slices, and 3 subpictures. The subpicture 1 contains two slices.

In the example as shown in FIG. 8, a picture is partitioned into 216 CTUs, 4 tiles, 4 slices and 3 subpictures. A value of sps_num_subpics_minus1 is 2, and the position-related syntax elements have the following values:

For subpicture 0
subpic_ctu_top_left_x[0], is not signaled but inferred as 0;
subpic_ctu_top_left_y[0], is not signaled but inferred as 0;
subpic_width_minus1[0], value is 8;
subpic_height_minus1[0], value is 11.
For subpicture 1
subpic_ctu_top_left_x[1], value is 9;
subpic_ctu_top_left_y[1], value is 0;
subpic_width_minus1[1], value is 8;
subpic_height_minus1[1], value is 5.
For subpicture 2
subpic_ctu_top_left_x[2], value is 9;
subpic_ctu_top_left_y[2], value is 6;
subpic_width_minus1[2], is not signaled but inferred as 8;
subpic_height_minus1[2], is not signaled but inferred as 5.

Signaling of Tiles

The following table exemplifies the signaling of tile sizes and coordinates of tiles inside a picture, which is from the Picture Parameter Set RBSP syntax table of VVC draft 8.

| | |
|---|---|
| no_pic_partition_flag | u(1) |
| if( !no_pic_partition_flag ) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i++ ) | |
|     tile_row_height_minus1[ i ] | ue(v) |
|   if( NumTilesInPic > 1 ) | |

The partitioning information (Address and dimensions each tile) of tiles is usually included in a parameter set. In the example above, first an indication is (no_pic_partition_flag) is included in the bitstream to indicate if the picture is partitioned into slices and tiles or not. If this indication is true (meaning the picture is not partitioned into slices or tiles) than it is inferred that the picture is partitioned into only one slice and only one tile, whose boundaries are aligned with picture boundaries. Otherwise (no_pic_partition_flag is false) tile partitioning information is included in the bitstream.

The syntax element tile_column_width_minus1[i] indicates the width of the i'th tile columns. The syntax element tile_row_height_minus1[i] indicates the height of the i'th tile row.

The tile row height and tile column widths can be either explicitly signaled in the bitstream or they can be inferred. The syntax elements num_exp_tile_columns_minus1 and num_exp_tile_rows_minus1 indicate the number of tile columns and tile rows respectively whose widths and heights are explicitly signaled. The widths and heights of the remaining tile columns and rows are inferred according to a function.

The indexing of tiles is according to the "tile scan order in the picture". The tiles in a picture are ordered (scanned) according to raster scan order, the first tile which is at the top-left corner of the picture is the 0th tile, and the index increases from left to right in each tile row and after the last tile in a tile row is scanned, one continues with the leftmost tile of the next tile row (one below current tile row).

Signaling of Slices

The following table exemplifies the signaling of tile sizes and coordinates rectangular shaped slices inside a picture, which is from the Picture Parameter Set RBSP syntax table of VVC draft 8.

| | |
|---|---|
| if( NumTilesInPic > 1 ) | |
|   rect_slice_flag | u(1) |
| if( rect_slice_flag ) | |
|   single_slice_per_subpic_flag | u(1) |
| if( rect_slice_flag && !single_slice_per_subpic_flag ) { | |
|   num_slices_in_pic_minus1 | ue(v) |
|   if( num_slices_in_pic_minus1 > 0 ) | |
|     tile_idx_delta_present_flag | u(1) |
|   for( i = 0; i < num_slices_in_pic_minus1; i++ ) { | |
|     if( NumTileColumns > 1 ) | |
|       slice_width_in_tiles_minus1[ i ] | ue(v) |
|     if( NumTileRows > 1 && | |
|       ( tile_idx_delta_present_flag \|\| tileIdx % NumTileColumns = = 0 ) ) | |
|       slice_height_in_tiles_minus1[ i ] | ue(v) |
|     if( slice_width_in_tiles_minus1[ i ] = = 0 && | |
|       slice_height_in_tiles_minus1[ i ] = = 0 && | |
|       RowHeight[ SliceTopLeftTileIdx[ i ] / NumTileColumns ] > 1 ) { | |
|       num_exp_slices_in_tile[ i ] | ue(v) |
|       numExpSlicesInTile = num_exp_slices_in_tile[ i ] | |
|       for( j = 0; j < numExpSlicesInTile; j++ ) | |
|         exp_slice_height_in_ctus_minus1[ j ] | ue(v) |
|       i += NumSlicesInTile[ i ] | |
|     } | |
|     if( tile_idx_delta_present_flag && i < num_slices_in_pic_minus1 ) | |
|       tile_idx_delta[ i ] | se(v) |
|   } | |
| } | |

In VVC draft 8, the following relationship between slices and tiles exist. Either a slice contains one or more complete tiles, or a tile contains one or more complete slices. Therefore, the slice coordinates and sizes are indicated w.r.t. tile partitioning. In VVC draft 8, first the tile partitioning is signaled in the picture parameter set. The slice partitioning information is signaled afterwards, using the tile mapping information.

In the above table, the syntax element num_slices_in_pic_minus1 indicates the number of slices inside a picture. Tile_idx_delta[i] indicates the difference between the tile indices of first tile of the (i+1)-th and i-th slices. For example, the index of the first tile of the first slice in a picture is 0. If the tile index of the first tile of the second inside the picture is 5, then Tile_idx_delta[0] is equal to 5. In this context the tile index is used as the address of the slice, i.e. the index of the first tile of a slice is the starting address of the slice.

slice_width_in_tiles_minus1[i] and slice_height_in_tiles_minus1[i] indicate the width and the height of the i-th slice inside the picture in number of tiles.

In the above table if slice_width_in_tiles_minus1[i] and slice_height_in_tiles_minus1[i] are both equal to 0 (indicating that i-th slice has a dimension of at most 1 tile in height and 1 tile in width), then the syntax element num_exp_slices_in_tile[i] can be included in the bitstream. This syntax element indicates the number of slices inside a tile.

As explained earlier, according to VVC draft 8, a slice may contain multiple complete tiles or a tile may contain multiple complete slices and other alternatives are prohibited. According to the syntax table above, first the number of tiles inside a slice is indicated (by including slice_width_in_tiles_minus1[i] and slice_height_in_tiles_minus1[i]). In addition, if the number of tiles inside a slice is equal to 1 according to the indication, number of slices inside the said tile is indicated (by num_exp_slices_in_tile[i]). So if slice_width_in_tiles_minus1[1] and slice_height_in_tiles_minus1[i] are both equal to 1, the actual size of the slice might be equal to or smaller than 1 tile.

The syntax element single_slice_per_subpic_flag, when true, indicates that there is one and only one slice per subpicture for all subpictures of a slice (i.e. a subpicture cannot be divided into more than 1 slice).

According to one alternative signaling method, the slice map (slice beginning addresses and slice sizes) are indicated in VVC draft 8 is according to following operations.

1. First, the tile partitioning map is indicated in the bitstream, where an index (that can be called tileIdx) is used to index all tiles in a picture (According to the tile scan order in picture). After this operation the indices, coordinates and sizes of each tile is known.
2. The number of slices in the picture is signaled. In one example, number of slices can be indicated by num_slices_in_pic_minus1 syntax element.
3. For the first slice in the picture, only width and height of the slice in number of tiles is indicated. The beginning address of the first slice is not explicitly signaled, but rather inferred to be tileIdx 0 (first tile in the picture is the first tile in the first slice of the picture).
4. If the size of the first slice is equal to 1 tile in width and 1 tile in height, and if there is more than 1 CTU rows inside the tile that is comprised within the first slice, then num_exp_slices_in_tile[0] syntax element is signaled, which indicates how many slices are comprised within the said tile (called numSlicesInTile[0]).
5. For each of the second slice till the last slice (including second slice but excluding the last slice) in the picture, width and height of the slice in number of tiles is explicitly indicated. The beginning address of the slice might be explicitly indicated by tile_idx_delta[i] syntax element, where i is the index of the slice. If the beginning address is not explicitly signaled (e.g. if slices are signaled in an order that makes it possible to infer the starting position of a next slice by using the starting position and width and height of the current slice), then the beginning address of the slice is inferred via a function.
6. If the size of the n-th slice (n is between 2 and number of slices in picture minus 1) is equal to 1 tile in width and 1 tile in height, and if there is more than 1 CTU rows inside the tile that is comprised within the first slice, then num_exp_slices_in_tile[n] syntax element is signaled, which indicates how many slices are comprised within the said tile.
7. For the last slice in the picture, the width and height of the slice is not explicitly signaled, but inferred according to the number of tiles in picture width, number of tiles in picture height and the starting address of the last slice. The starting address of the last slice can be explicitly indicated or inferred. The inference of the width and height of the last slice in picture can be performed according to following two equations, which are from the section 6.5.1 of VVC Draft 8.

$$\text{slice\_width\_in\_tiles\_minus1}[i] = NumTileColumns - 1 - tileX$$

$$\text{slice\_height\_in\_tiles\_minus1}[i] = NumTilesRows - 1 - tileY$$

As it can be seen from the operations explained above, the width and height of the last slice is not signaled. It is desirable to not include the width and height of the last slice in the bitstream, since it can be easily inferred if the beginning address of the slice is known. As a result, efficient compression is achieved by not including redundant information in the bitstream.

The variables tileX, tileY, NumTileColumns, NumTileRows in the above equation are explained later.

Section 6.5.1 of VVC draft 8

6.5.1 CTB raster scanning, tile scanning, and subpicture scanning processes

For rectangular slices, the list NumCtusInSlice[i] for i ranging from 0 to num_slices_in_pic_minus1, inclusive, specifying the number of CTU in the i-th slice, the list SliceTopLeftTileIdx[i] for i ranging from 0 to num_slices_in_pic_minus1, inclusive, specifying the index of the top-left tile of the slice, and the matrix CtbAddrInSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, are derived as follows:

```
if( single_slice_per_subpic_flag) {
  for( i =0; i <= sps_num_subpics_minus1; i++)
    NumCtusInSlice[ i ] = 0
  for( i = 0; i < PicSizeInCtbsY; i ++) {
    sliceIdx = subpic_info_present_flag ? CtbToSubpicIdx[ i ] : 0
    CtbAddrInSlice[ sliceIdx ][ NumCtusInSlice[ sliceIdx ] ] = i
    NumCtusInSlice[ sliceIdx ]++
  }
} else {
  tileIdx =0
  for( i = 0; i <= num_slices_in_pic minus1; i++ )
    NumCtusInSlice[ i ] = 0
  for( i = 0; i <= num_slices_in_pic_minus1; i++) {
    SliceTopLeftTileIdx[ i ] = tileIdx
    tileX = tileIdx % NumTileColumns
    tileY = tileIdx / NumTileColumns
    if( i = = num_slices_in_pic minus1 ) {
```

-continued

```
        slice_width_in_tiles_minus1[ i ] = NumTileColumns − 1 − tileX
        slice_height_in_tiles_minus1[ i ] = NumTileRows − 1 − tileY
        NumSlicesInTile[ i ] = 1
      }
      if( slice_width_in_tiles_minus1[ i ] = = 0 &&
slice_height_in_tiles_minus1[ i ] = = 0 ) {                                    (20)
        ctbY = tileRowBd[ tileY ]
        for( j = 0; j < NumSlicesInTile[ i ] − 1; j++ ) {
          AddCtbsToSlice( i, tileColBd[ tileX ], tileColBd[ tileX + 1 ],
              ctbY, ctbY + SliceHeightInCtusMinus1[ i ] + 1 )
          ctbY += SliceHeightInCtusMinus1[ i ] + 1
          i++
        }
        AddCtbsToSlice( i, tileColBd[ tileX ], tileColBd[ tileX +1 ], ctbY,
tileRowBd[ tileY + 1 ] )
      } else
        for( j = 0; j <= slice_height_in_tiles_minus1[ i ]; j++ )
          for( k = 0; k <= slice_width_in_tiles_minus1[ i ]; k++ )
            AddCtbsToSlice( i, tileColBd[ tileX + k ],
tileColBd[ tileX + k + 1],
              tileRowBd[ tileY + j ], tileRowBd[ tileY + j + 1 ] )
      if( tile_idx_delta_present_flag )
        tileIdx += tile_idx_delta[ i ]
      else {
        tileIdx + = slice_width_in_tiles_minus1[ i ] + 1
        if( tileIdx % NumTileColumns = = 0 )
          tileIdx += slice_height_in_tiles_minus1[ i ] * NumTileColumns
      }
    }
  }
}
```

Where the function AddCtbsToSlice(sliceIdx, startX, stopX, startY, stopY) is specified as follows:

```
for( ctbY = startY; ctbY < stopY; ctbY++ )
  for( ctbX = startX; ctbX < stopX; ctbX++ ) {
    CtbAddrInSlice[ sliceIdx ][ NumCtusInSlice[ sliceIdx ] ] =
ctbY * PicWidthInCtbsY + ctbX                                                (30)
    NumCtusInSlice[ sliceIdx ]++
  }
```

Again, for the sake of completeness, Versatile Video Coding according to Recommendation ITU-T H.266 (ISO/IEC 23090-3:2020) cited via http://handle.itu.int/11.1002/1000/14336, of 2020-08-29, cites almost the same, as When rect_slice_flag is equal to 1, the list NumCtusInSlice[i] for i ranging from 0 to num_slices_inpic_minus1, inclusive, specifying the number of CTUs in the i-th slice, the list SliceTopLeftTileIdx[i] for i ranging from 0 to num_slices_in_pic_minus1, inclusive, specifying the tile index of the tile containing the first CTU in the slice, and the matrix CtbAddrInSlice[i][j] for i ranging from 0 to num_slices_in_pic_minus1, inclusive, and j ranging from 0 to NumCtusInSlice[i]−1, inclusive, specifying the picture raster scan address of the j-th CTB within the i-th slice, and the variable NumSlicesInTile[i], specifying the number of slices in the tile containing the i-th slice, are derived as follows:

```
if( single_slice_per_subpic_flag) {
  if( !sps_subpic_info_present_flag ) /* There is no subpicture info and only one slice in a
picture. */
    for( j = 0; j < NumTileRows; j++ )
      for( i = 0; i < NumTileColumns; i++ )
        AddCtbsToSlice(    0,      TileColBdVal[ i ],      TileColBdVal[ i + 1 ],
TileRowBdVal[ j ],
              TileRowBdVal[ j +1 ] )
  else {
    for( i = 0; i <= sps_num_subpics_minus1; i++ ) {
      NumCtusInSlice[ i ] = 0
      if( subpicHeightLessThanOneTileFlag[ i ]) /* The slice consists of a set of CTU
rows in a tile. */
        AddCtbsToSlice( i, sps_subpic_ctu_top_left_x[ i ],
          sps_subpic_ctu_top_left_x[ i ] + sps_subpic_width_minus1[ i ] + 1,
          sps_subpic_ctu_top_left_y[ i ],
          sps_subpic_ctu_top_left_y[ i ] + sps_subpic_height_minus1[ i ] + 1 )
      else { /* The slice consists of a number of complete tiles covering a rectangular
region. */
        tileX = ctbToTileColIdx[ sps_subpic_ctu_top_left_x[ i ] ]
        tileY = ctbToTileRowIdx[ sps_subpic_ctu_top_left_y[ i ] ]
        for( j = 0; j < SubpicHeightInTiles[ i ]; j++ )
          for( k = 0; k < SubpicWidthInTiles[ i ]; k++ )
            AddCtbsToSlice(    i,    TileColBdVal[ tileX + k ],
TileColBdVal[ tileX + k + 1 ],
              TileRowBdVal[ tileY + j ], TileRowBdVal[ tileY + j +1 ] )
      }
    }
  }
} else {
  tileIdx = 0
  for( i = 0; i <= num_slices_in_pic minus1; i++ )
    NumCtusInSlice[ i ] = 0
  for( i = 0; i <= num_slices_in_pic minus1; i++ ) {
    SliceTopLeftTileIdx[ i ] = tileIdx
    tileX = tileIdx % NumTileColumns
    tileY = tileIdx / NumTileColumns
    if( i < num_slices_in_pic minus1 ) {
      sliceWidthInTiles[ i ] = slice_width_in_tiles_minus1[ i ] + 1
      sliceHeightInTiles[ i ] = slice_height_in_tiles_minus1[ i ] + 1
    } else {
      sliceWidthInTiles[ i ] = NumTileColumns − tileX
      sliceHeightInTiles[ i ] = NumTileRows − tileY
      NumSlicesInTile[ i ] = 1
    }
```

```
        if( sliceWidthInTiles[ i ]  = =   1 && sliceHeightInTiles[ i ]  = =   1 ) {   (21)
            if( num_exp_slices_in_tile[ i ]  = = 0 ) {
                NumSlicesInTile[ i ] = 1
                sliceHeightInCtus[ i ]                                              =
RowHeightVal[ SliceTopLeftTileIdx[ i ] / NumTileColumns ]
            } else {
                remainingHeightInCtbsY                                              =
RowHeightVal[ SliceTopLeftTileIdx[ i ] / NumTileColumns ]
                for( j = 0; j < num_exp_slices_in_tile[ i ]; j++ ) {
                    sliceHeightInCtus[ i + j ] = exp_slice_height_in_ctus_minusl[ i ][ j ] +
1
                    remainingHeightInCtbsY -= sliceHeightInCtus[ i + j ]
                }
                uniformSliceHeight = sliceHeightInCtus[ i + j - 1 ]
                while( remainingHeightInCtbsY >= uniformSliceHeight ) {
                    sliceHeightInCtus[ i + j ] = uniformSliceHeight
                    remainingHeightInCtbsY -= uniformSliceHeight
                    j++
                }
                if( remainingHeightInCtbsY > 0 ) {
                    sliceHeightInCtus[ i + j ] = remainingHeightInCtbsY
                    j++
                }
                NumSlicesInTile[ i ] = j
            }
            ctbY = TileRowBdVal[ tileY ]
            for( j = 0; j < NumSlicesInTile[ i ]; j++ ) {
                AddCtbsToSlice( i + j, TileColBdVal[ tileX ], TileColBdVal[ tileX +1 ],
                      ctbY, ctbY + sliceHeightInCtus[ i + j ] )
                ctbY += sliceHeightInCtus[ i + j ]
                sliceWidthInTiles[ i + j ] = 1
                sliceHeightInTiles[ i + j ] = 1
            }
            i += NumSlicesInTile[ i ] - 1
        } else
            for( j = 0; j < sliceHeightInTiles[ i ]; j++ )
                for( k = 0; k < sliceWidthInTiles[ i ]; k++ )
                    AddCtbsToSlice(    i,    TileColBdVal[ tileX + k ],
TileColBdVal[ tileX + k + 1 ],
                       TileRowBdVal[ tileY + j ], TileRowBdVal[ tileY + j +1 ] )
        if( i < num_slices_in_pic minus1 ) {
            if( tile_idx_delta_present_flag )
                tileIdx += tile_idx_delta_vall[ i ]
            else {
                tileIdx += sliceWidthInTiles[ i ]
                if( tileIdx % NumTileColumns = = 0 )
                    tileIdx += ( sliceHeightInTiles[ i ] - 1 ) * NumTileColumns
            }
        }
    }
}
```

Where the function AddCtbsToSlice(sliceIdx, startX, stopX, startY, stopY) is specified as follows:

```
for( ctbY = startY; ctbY < stopY; ctbY++ )
    for( ctbX = startX; ctbX < stopX; ctbX++ ) {
        CtbAddrInSlice[ sliceIdx ][ NumCtusInSlice[ sliceIdx ] ]    =
ctbY * PicWidthInCtbsY + ctbX ( 22 )
        NumCtusInSlice[ sliceIdx ]++
    }
```

It is now referred to the above indicated text of VVC draft 8.

The above step-by-step description of the signaling of slice map inside a picture is one example of signaling in VVC draft8. More specifically, the description describes the case where rectangular shaped slices are used, the number of slices per subpicture is not indicated to be equal to 1, more than 1 tile is present in the picture, and number of CTU rows inside a tile is greater than 1. If some of the said parameters are changed, other modes of signaling of slice map can be used. For example if it is indicated that there is only 1 slice per subpicture, width and heights of the slices are not explicitly signaled in the bitstream, but rather inferred to be equal to corresponding subpicture width and height.

The subclause 6.5.1 of VVC draft 8 specifies the scan order of CTUs inside a slice i, where i is the slice index. The matrix CtbAddrInSlice[i][n], which is the output of this subclause, specifies the CTU scan order inside slice i, where n is the CTU index that is between 0 to number of CTUs of slice i. The value of CtbAddrInSlice[i][n] specifies the address of the n-th CTU in slice i (in raster scan order in a picture).

Figure 9:
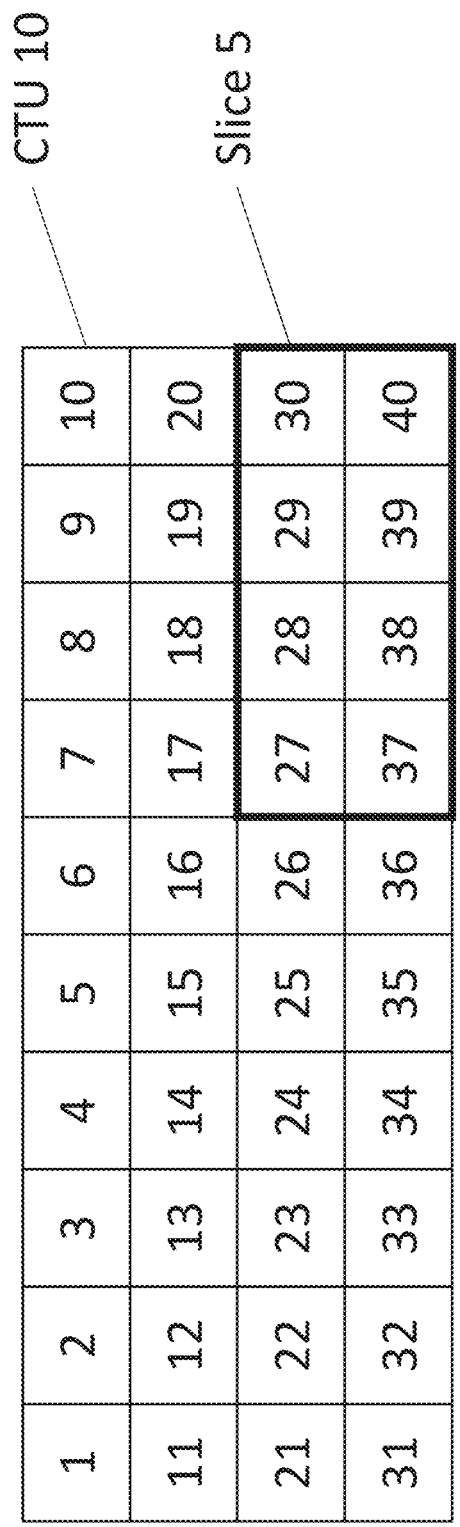
FIG. 9 shows a raster scan order in a picture of CTUs and one slice in the picture, as example.

FIG. 9 shows raster scan order in a picture of CTUs ("CTU raster scan order in a picture") and one slice (slice 5, i.e. the 5-th slice in the picture) in the picture as example. In other words, FIG. 9 illustrates a raster scan order of CTUs inside a picture, wherein the picture is composed of 1 tile and 1 subpicture.

According to this example the values of the CtbAddrIn-Slice is as follows:
CtbAddrInSlice[4][0]=27
CtbAddrInSlice[4][1]=28

CtbAddrInSlice[4][2]=29
CtbAddrInSlice[4][3]=30
CtbAddrInSlice[4][4]=37
CtbAddrInSlice[4][5]=38
CtbAddrInSlice[4][6]=39
CtbAddrInSlice[4][7]=40

The terms used in the disclosure
"tile scan order in the picture", explained in the disclosure
"CTU scan order inside a tile", explained in the disclosure
"CTU scan order inside a slice", explained in the disclosure
"CTU raster scan order in a picture", explained in the disclosure
"Tile-based scan order of CTUs inside a picture"
"Scanning order" refers to the indexing, according to the order in which the index is incremented, of X in Y.
"Processing" means decoding or encoding in the encoder or decoder. Therefore, the processing order means the order in which X (e.g. a CTU) is processed in in the encoder or decoder.

In the VVC draft 8, when there are more than 1 tiles per picture, the signaling of a slice is as follows:
1. Using explicit indication or inference, determine the starting tile address of a slice in number of tiles.
2. For each slice except for the last slice signal how many tiles the slice comprises.
    a. If the slice is determined to comprise 1 tile only, indicate how many slices are comprised within the tile.
3. For the last slice in picture, infer the number of tiles in the slice if the slice is determined to include at least 1 complete tile.

In other words, in VVC Draft 8 if the size of the last slice in picture is greater than or equal to 1 tile in width and height in both dimensions, than the size of the last slice is inferred and not signaled.

This can be seen in Table 1, where the slice_width_in_tiles_minus1[i] and slice_height_in_tiles_minus1[i] (which indicate the width and height of the i-th slice in number of tiles respectively) is included in the bitstream if is smaller than num_slices_in_pic_minus1 (due to the for-loop "for (i=0; i<num_slices_in_pic_minus1; i++)"). Hence, the width and height of the slice is not signaled when i is equal to num_slices_in_pic_minus1, i.e. for the last slice.

Luma Mapping with Chroma Scaling (LMCS)

Figure 11:
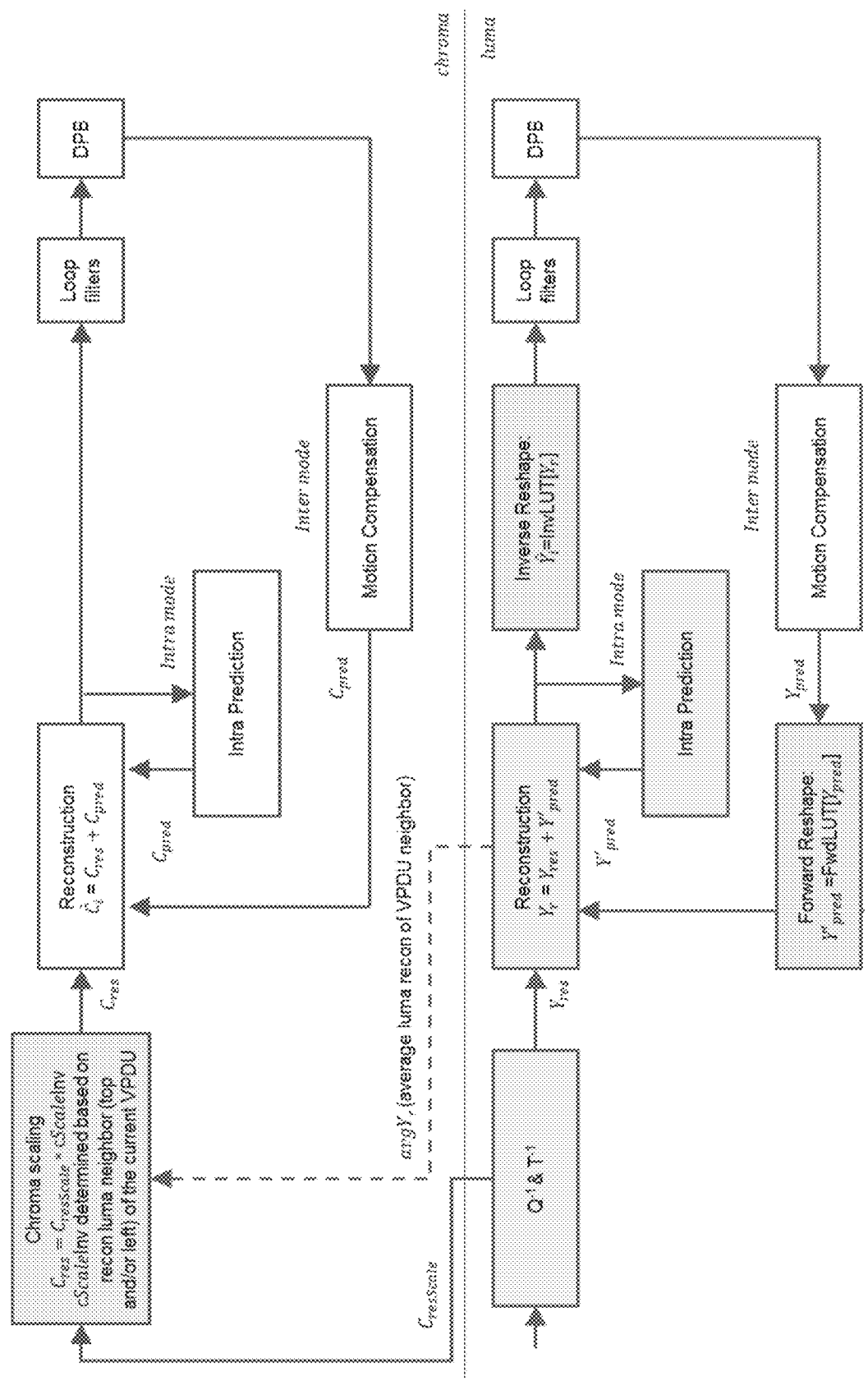
FIG. 11 is a block diagram showing an example of the LMCS architecture.

In VVC, a coding tool called the luma mapping with chroma scaling (LMCS) is added as a new processing block before the loop filters. LMCS has two main components: 1) in-loop mapping of the luma component based on adaptive piecewise linear models; 2) for the chroma components, luma-dependent chroma residual scaling is applied. FIG. 11 shows the LMCS architecture from a decoder's perspective. The light-blue shaded blocks in FIG. 11 indicate where the processing is applied in the mapped domain; and these include the inverse quantization, inverse transform, luma intra prediction and adding of the luma prediction together with the luma residual. The unshaded blocks in FIG. 11 indicate where the processing is applied in the original (i.e., non-mapped) domain; and these include loop filters such as deblocking, ALF, and SAO, motion compensated prediction, chroma intra prediction, adding of the chroma prediction together with the chroma residual, and storage of decoded pictures as reference pictures. The light-yellow shaded blocks in FIG. 11 are the new LMCS functional blocks, including forward and inverse mapping of the luma signal and a luma-dependent chroma scaling process. Like most other tools in VVC, LMCS can be enabled/disabled at the sequence level using an SPS flag.

slice header: A part of a coded slice containing the data elements pertaining to all tiles or CTU rows within a tile represented in the slice.

Slice Header

TABLE 3

| | Descriptor | |
|---|---|---|
| slice_header( ) { | | |
|   picture_header_in_slice_header_flag | u(1) | 1 |
|   if( picture_header_in_slice_header_flag ) | | 2 |
|     picture_header_structure( ) | | 3 |
|   if( subpic_info_present_flag ) | | 4 |
|     slice_subpic_id | u(v) | 5 |
|   if( ( rect_slice_flag && NumSlicesInSubpic[ CurrSubpicIdx ] > 1 ) \|\| | | 6 |
|     ( !rect_slice_flag && NumTilesInPic > 1 ) ) | | |
|     slice_address | u(v) | 7 |
|   for( i = 0; i < NumExtraPhBits; i++ ) | | 8 |
|     sh_extra_bit[ i ] | u(1) | 9 |
|   if( !rect_slice_flag && NumTilesInPic > 1 ) | | 10 |
|     num_tiles_in_slice_minus1 | ue(v) | 11 |
|   if( ph_inter_slice_allowed_flag ) | | 12 |
|     slice_type | ue(v) | 13 |
| ... | | 14 |
|   if( ph_lmcs_enabled_flag ) | | 15 |
|     slice_lmcs_enabled_flag | u(1) | 16 |
|   if( pic_scaling_list_enabled_flag ) | | 17 |
|     slice_scaling_list_present_flag | u(1) | 18 |
| ... | | 19 |

The Table 3 exemplifies the part of the slice header syntax structure of VVC Draft 8. The lines that include " . . . " indicate some of the rows in the table are omitted.

In the slice header, the syntax elements indicate the following: picture_header_in_slice_header_flag indicates whether the picture header syntax structure is present in the slice header or not. If the picture header syntax structure is not present in the slice header, it must be included in the Picture header, which must be included in the bitstream. slice_address indicates the tile index of the first tile of the slice. num_tiles_in_slice_minus1 indicates the number of tiles included in the slice.

Figure 10:
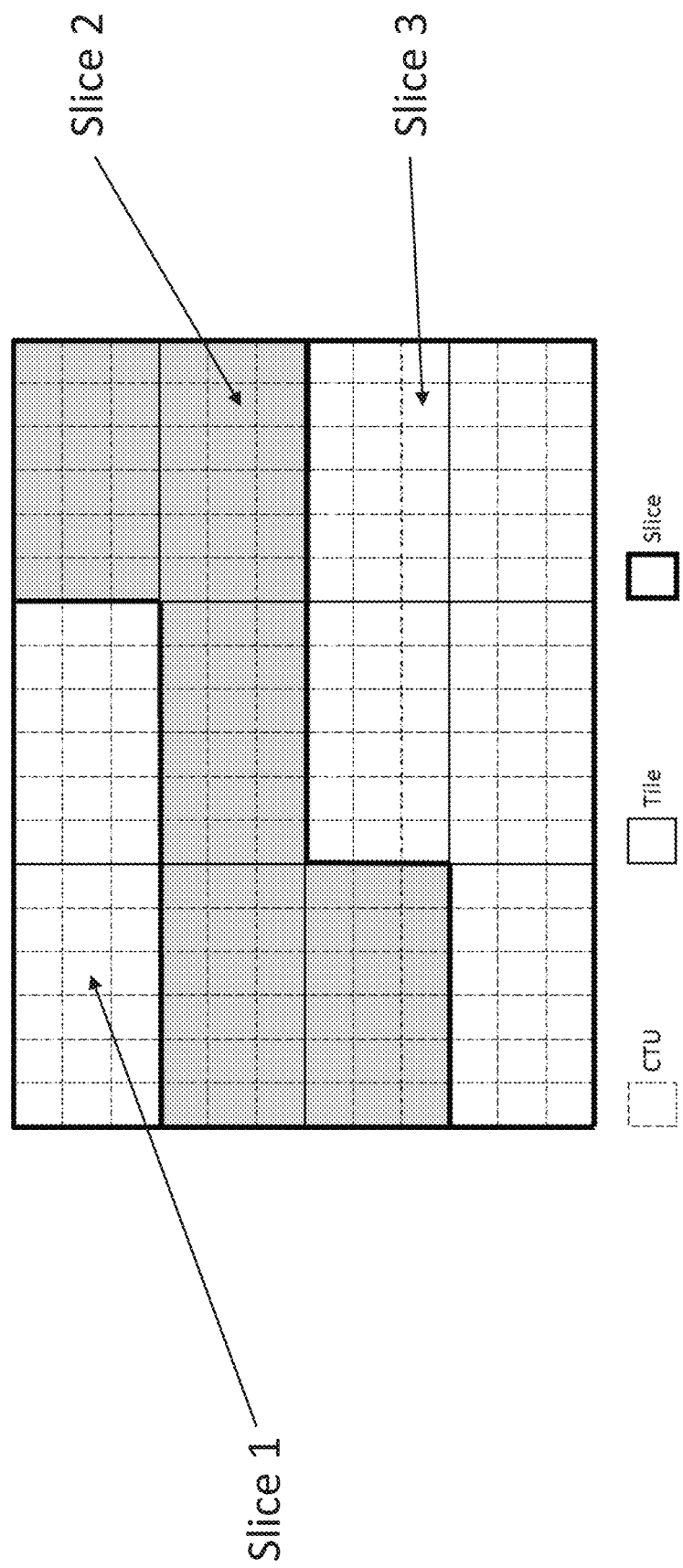
FIG. 10 exemplifies a picture that is partitioned into 12 tiles and 3 slices.

FIG. 10 exemplifies a picture that is partitioned into 12 tiles and 3 slices. Or, in other words, FIG. 10 illustrates a picture with 18 by 12 luma CTUs that is partitioned into 12 tiles and 3 raster-scan slices.

In this example, illustrated in FIG. 10, the slice address and num_tiles_in_slice_minus1 syntax elements assume the following values for each slice of the picture:

Slice 1
  slice_address=0, the slice starting address is tile index 0.
  num_tiles_in_slice_minus1=1, slice is composed of 2 tiles.

Slice 2
  slice_address=2, the slice starting address is tile index 2.
  num_tiles_in_slice_minus1=5, slice is composed of 5 tiles.

Slice 3
  slice_address=7, the slice starting address is tile index 7.
  num_tiles_in_slice_minus1=4, slice is composed of 5 tiles.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

The starting tile of a slice (the address of the slice in the picture) and the number of tiles inside a picture can be indicated using 2 methods. When rect_slice_flag is equal to 1, which indicates that the slices of the picture have rectangular shape, then the signaling mechanism in Table 1 is used. The Table 1 represents a part of Picture Parameter set. In this mechanism, the addresses and sizes of all slices of a picture are signaled in the picture parameter set before the first slice of the picture in the bitstream. It is noted that the bitstream has an order in which the information (picture parameter sets, slices of the picture and syntax elements inside syntax structures etc.) is included (or parsed from) in the bitstream.

Otherwise if rect_slice_flag is equal to 0, which indicates that the slices of a picture does not need to be rectangular in shape, then the slice_address and num_tiles_in_slice_minus1 syntax elements in the slice header indicate the address and the size of the slice.

Picture Header 7.3.2.6 Picture Header RBSP Syntax

| | Descriptor |
|---|---|
| picture_header_rbsp( ) { | |
|   picture_header_ structure( ) | |
|   rbsp_trailing_bits( ) | |
| } | |

The above table presents the picture header syntax according to VVC Draft 8. It includes the picture header structure and rbsp_trailing_bits( ), which are filler bits to make the number of bits in a picture header equal to multiple of 8.

Picture Header Structure 7.3.2.7 Picture Header Structure Syntax

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
| ... | |
| ... | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
| ... | |

Picture header structure includes syntax elements that are applicable to all slices of a picture. Some of the syntax elements comprised in the picture header structure are presented in the table above. As an example, the ph_lmcs_enabled_flag indicates whether the LMCS (Luma mapping with chroma scaling) coding tool is enabled for the slices of the picture or not.

ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

As it can be seen above, the picture header structure can be present either in the slice header or in the picture header. According to VVC Draft 8, the picture header must be either in slice header or in the picture header for a picture. If picture header structure is in the picture header, all slices of the picture referring to the said picture header must not include picture header structure. Also the other way around is true, if the picture header structure is not in the picture header, and hence the picture header is not included in the bitstream for a specific picture, the picture header structure must be in the slice headers of the slices of the said picture.

Furthermore, there is another restriction in VVC Draft8, wherein if the picture header structure is in the slice header, than the picture must be composed of only one slice (i.e. the picture cannot be divided into multiple slices.

The current VVC Draft 8 is not efficient since slice_adress and num_tiles_in_slice_minus1 are redundantly included in the bitstream in certain cases. Redundant inclusion of the slice_adress and num_tiles_in_slice_minus1 in the bitstream increases the bitrate since every slice header of a picture can include this syntax element, hence compression efficiency is reduced.

Embodiment 1

According to an embodiment the presence of the slice_address and num_tiles_in_slice_minus1 syntax elements in the slice header are controlled based on the presence of picture header structure in the slice header.

|  | Descriptor |  |
|---|---|---|
| slice_header( ) { |  |  |
|   picture_header_in_slice_header_flag | u(1) | 1 |
|   if( picture_header_in_slice_header_flag ) |  | 2 |
|     picture_header_structure( ) |  | 3 |
|   if( subpic_info_present_flag ) |  | 4 |
|     slice_subpic_id | u(v) | 5 |
|   if( ( rect_slice_flag && NumSlicesInSubpic[ CurrSubpicIdx ] > 1 ) \|\|<br>    (!picture_header_in_slice_header_flag && ( !rect_slice_flag && NumTilesInPic ><br>1 )) ) |  | 6 |
|     slice_address | u(v) | 7 |
|   for( i = 0; i < NumExtraPhBits; i++ ) |  | 8 |
|     sh_extra_bit[ i ] | u(1) | 9 |
|   if( !rect_slice_flag && NumTilesInPic > 1 && !picture_header_in_slice_header_flag) |  | 10 |
|     num_tiles_in_slice_minus1 | ue(v) | 11 |
| ... |  |  |

Embodiments of the application can be implemented as in the table above. In an embodiment, the slice_address is included in the slice header when the condition in line 6 evaluates to true. In other words, slice_address is included in the slice header if:

number of tiles in the picture is greater than 1 AND non-rectangular slices are allowed (rect_slice_flag=0) AND picture header structure is not present in the slice header. OR (rect_slice_flag=1) and number of slices in the current subpicture is greater than 1.

Otherwise, slice_address is not included in the slice header and its value can infer to be equal to 0.

Additionally or alternatively, the presence of the num_tiles_in_slice_minus1 syntax element in the slice header can be controlled by the presence of the picture header structure in the slice header. For example the num_tiles_in_slice_minus1 is not included in the slice header if picture header structure in the slice header.

Line 10 in the above table shows an embodiment where num_tiles_in_slice_minus1 is included in the slice header if:

Rect_slice_flag is equal to 0 and number of tiles in the picture is greater than 1 and picture_header_in_slice_header_flag is equal to 0.

Otherwise, num_tiles_in_slice_minus1 is not included in the slice header and its value can inferred to be equal to number of tiles in the picture minus 1.

As it is explained earlier, there is a bitstream conformance requirement in VVC Draft 8 that restricts the inclusion of the picture header structure in the slice header. According to VVC Draft 8 the picture header structure can be included in the slice header if there is one slice per picture.

In an embodiment, the presence of the picture header structure in the slice header is used to control the presence of the slice_address and number of tiles in the slice indications, since if there is a single slice in a picture the slice address must be equal to the first tile in the picture and the number of tiles in the slice must be equal to the number of tiles in the picture.

Embodiment 2

|  | Descriptor |  |
|---|---|---|
| slice_header( ) { |  |  |
|   picture_header_in_slice_header_flag | u(1) | 1 |
|   if( picture_header_in_slice_header_flag ) |  | 2 |
|     picture_header_structure( ) |  | 3 |
|   if( subpic_info_present_flag ) |  | 4 |
|     slice_subpic_id | u(v) | 5 |
|   if( ( rect_slice_flag && NumSlicesInSubpic[ CurrSubpicIdx ] > 1 ) \|\|<br>    (!picture_header_in_slice_header_flag && ( !rect_slice_flag && NumTilesInPic ><br>1 )) ) |  | 6 |
|     slice_address | u(v) | 7 |
|   for( i = 0; i < NumExtraPhBits; i++ ) |  | 8 |
|     sh_extra_bit[ i ] | u(1) | 9 |
|   if( !rect_slice_flag && NumTilesInPic > 1 && !picture_header_in_slice_header_flag<br>&& NumTilesInPic − slice_address > 1) |  | 10 |
|     num_tiles_in_slice_minus1 | ue(v) | 11 |

Additionally or alternatively, the presence of the num_tiles_in_slice_minus1 in the slice header is controlled by the difference between the number of tiles in a picture (e.g. NumTilesInPic in the above table) and the slice_address.

More specifically if the difference between the number of tiles in a picture and the slice_address is smaller than a threshold the num_tiles_in_slice_minus1 is not included in the slice header and its value is inferred to be equal to a predefined number. For example if the difference between NumTilesInPic and slice_address is smaller than or equal to 1, num_tiles_in_slice_minus1 is not included in the bitstream and its value is inferred to be equal to 0 (indicating that there is one tile in the current slice).

slice_address specifies the slice address of the slice. When not present, the value of slice_address is inferred to be equal to 0.

If rect_slice_flag is equal to 0, the following applies:
The slice address is the raster scan tile index of the first tile in the slice.
The length of slice_address is Ceil(Log 2 (NumTilesInPic)) bits.
The value of slice_address shall be in the range of 0 to NumTilesInPic−1, inclusive.

Otherwise (rect_slice_flag is equal to 1), the following applies:

The slice address is the subpicture-level slice index of the current slice, i.e., SubpicLevelSliceIdx[j], where j is the picture-level slice index of the current slice.

The length of slice_address is Ceil(Log 2(NumSlicesInSubpic[CurrSubpicIdx])) bits.

The value of slice_address shall be in the range of 0 to NumSlicesInSubpic[CurrSubpicIdx]−1, inclusive.

It is a requirement of bitstream conformance that the following constraints apply:

If rect_slice_flag is equal to 0 or sps_subpic_info_present_flag is equal to 0, the value of slice_address shall not be equal to the value of slice_address of any other coded slice NAL unit of the same coded picture.

Otherwise, the pair of subpic_id and slice_address values shall not be equal to the pair of subpic_id and slice_address values of any other coded slice NAL unit of the same coded picture. The shapes of the slices of a picture shall be such that each CTU, when decoded, shall have its entire left boundary and entire top boundary consisting of a picture boundary or consisting of boundaries of previously decoded CTU(s).

num_tiles_in_slice_minus1 plus 1, when present, specifies the number of tiles in the slice. The value of num_tiles_in_slice_minus1 shall be in the range of 0 to NumTilesInPic−1, inclusive. When not present, the value of num_tiles_in_slice_minus1 shall be inferred to be equal to 0.

The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

```
if( rect_slice_flag ) {
  picLevelSliceIdx = slice_address
  for( j = 0; j < CurrSubpicIdx; j++ )
    picLevelSliceIdx += NumSlicesInSubpic[ j ]
  NumCtusInCurrSlice = NumCtusInSlice[ picLevelSliceIdx ]
  for( i = 0; i < NumCtusInCurrSlice; i++ )
    CtbAddrInCurrSlice[ i ] = CtbAddrInSlice[ picLevelSliceIdx ][ i ]   ( 112 )
} else {
  NumCtusInCurrSlice = 0
  for( tileIdx = slice_address; tileIdx <= slice_address + num_tiles_in_slice_minus1;
tileIdx++ ) {
    tileX = tileIdx % NumTileColumns
    tileY = tileIdx / NumTileColumns
    for( ctbY = TileRowBdVal[ tileY ]; ctbY < TileRowBdVal[ tileY + 1 ]; ctbY++ ) {
      for( ctbX = TileColBdVal[ tileX ]; ctbX < TileColBdVal[ tileX +1 ]; ctbX++ ) {
        CtbAddrInCurrSlice[ NumCtusInCurrSlice ]
ctbY * PicWidthInCtbsY + ctbX
        NumCtusInCurrSlice++
      }
    }
  }
}
```

The variables SubpicLeftBoundaryPos, SubpicTopBoundaryPos, SubpicRightBoundaryPos, and SubpicBotBoundaryPos are derived as follows:

```
if( sps_subpic_treated_as_pic_flag[ CurrSubpicIdx ] ) {
  SubpicLeftBoundaryPos = sps_subpic_ctu_top_left_x[ CurrSubpicIdx ] * CtbSizeY
  SubpicRightBoundaryPos = Min( sps_pic_width_max_in_luma_samples − 1,
    ( sps_subpic_ctu_top_left_x[ CurrSubpicIdx ] +
    sps_subpic_width_minus1[ CurrSubpicIdx ]+ 1 ) * CtbSizeY − 1 )
  SubpicTopBoundaryPos = sps_subpic_ctu_top_left_y[ CurrSubpicIdx ] * CtbSizeY(113)
  SubpicBotBoundaryPos = Min( sps_pic_height_max_in_luma_samples − 1,
    ( sps_subpic_ctu_top_left_y[ CurrSubpicIdx ] +
    sps_subpic_height_minus1[ CurrSubpicIdx ] + 1 ) * CtbSizeY − 1 )
}
```

Embodiment 3

| | Descriptor | |
|---|---|---|
| slice_header( ) { | | |
|   picture_header_in_slice_header_flag | u(1) | 1 |
|   if( picture_header_in_slice_header_flag ) | | 2 |
|     picture_header_structure( ) | | 3 |
|   if( subpic_info_present_flag ) | | 4 |
|     slice_subpic_id | u(v) | 5 |
|   if( ( rect_slice_flag && NumSlicesInSubpic[ CurrSubpicIdx ] > 1 ) \|\| | | 6 |
|     ( !rect_slice_flag && NumTilesInPic > 1 ) ) | | |
|     slice_address | u(v) | 7 |
|   for( i = 0; i < NumExtraPhBits; i++ ) | | 8 |

-continued

|  | Descriptor |  |
|---|---|---|
| extra_bit[ i ] | u(1) | 9 |
| if( !rect_slice_flag && NumTilesInPic > 1 ) |  | 10 |
| num_tiles_in_slice_minus1 | ue(v) | 11 |
| if( ph_inter_slice_allowed_flag ) |  | 12 |
| slice_type | ue(v) | 13 |
| ... |  | 14 |
| if( ph_lmcs_enabled_flag && !picture_header_in_slice_header_flag) |  | 15 |
| slice_lmcs_enabled_flag | u(1) | 16 |
| if( pic_scaling_list_enabled_flag ) |  | 17 |
| slice_scaling_list_present_flag | u(1) | 18 |
| ... |  | 19 |

Additionally or alternatively the presence of the slice_lmcs_enabled_flag in the slice header is controlled based on the presence of picture header structure in the slice header. Example implementation is included in the table above in line 15.

More specifically, if the picture header structure is included in the slice header, the slice_lmcs_enabled_flag is not included in the slice header. Additionally when not included in the slice header the value of slice_lmcs_enabled_ flag can be inferred according to the following rule:

The value of slice_lmcs_enabled_flag is inferred to be equal to ph_lmcs_enabled_flag.

Alternatively or additionally, the value of slice_lmcs_enabled_flag can be inferred according to the following rule when it is not present in the slice header:

The value of slice_lmcs_enabled_flag is inferred to be equal to ph_lmcs_enabled_flag when the picture_header_in_slice_header_flag is equal to 1 (picture header structure is included in the slice header).

Alternatively or additionally, the value of slice_lmcs_enabled_flag can be inferred according to the following rule when it is not present in the slice header:

The value of slice_lmcs_enabled_flag is inferred to be equal to 0 when the picture_header_in_slice_header_flag is equal to 0.

The embodiments above can be implemented by replacing the condition "!rect_slice_flag && NumTilesInPic>1" in lines 6 and 10 with "!rect_slice_flag". In some example implementations if the value of rect_slice_flag is equal to 0, indicating that the slices in picture are not necessarily rectangular, the value of NumTilesInPic syntax element must be greater than 0 (e.g. the number of tiles in the slice must be greater than 1). In other words, the value of rect_slice_flag can only be equal to 0, if the number of tiles in a picture is greater than 1. In such implementation, the condition "!rect_slice_flag && NumTilesInPic>1" and "!rect_slice_flag" would have identical results. Therefore the conditions (in lines 6 and 10 in all of the embodiments above), the conditions including "!rect_slice_flag && NumTilesInPic>1" part of the condition can be replaced with "!rect_slice_flag".

The embodiments above can be implemented by replacing the condition "!rect_slice_flag && NumTilesInPic>1" in lines 6 and 10 with "!rect_slice_flag". In some example implementations if the value of rect_slice_flag is equal to 0, indicating that each slice in picture comprises one or more tiles, and if picture_header_in_slice_header_flag is equal to 0, indicating the number of slices in picture is greater than 1, so NumTilesInPic must greater than 1 if picture_header_in_slice_header_flag is equal to 0 and rect_slice_flag is equal to 0.

Following is an explanation of the applications of the encoding method as well as the decoding method as shown in the above-mentioned embodiments, and a system using them.

Figure 14:
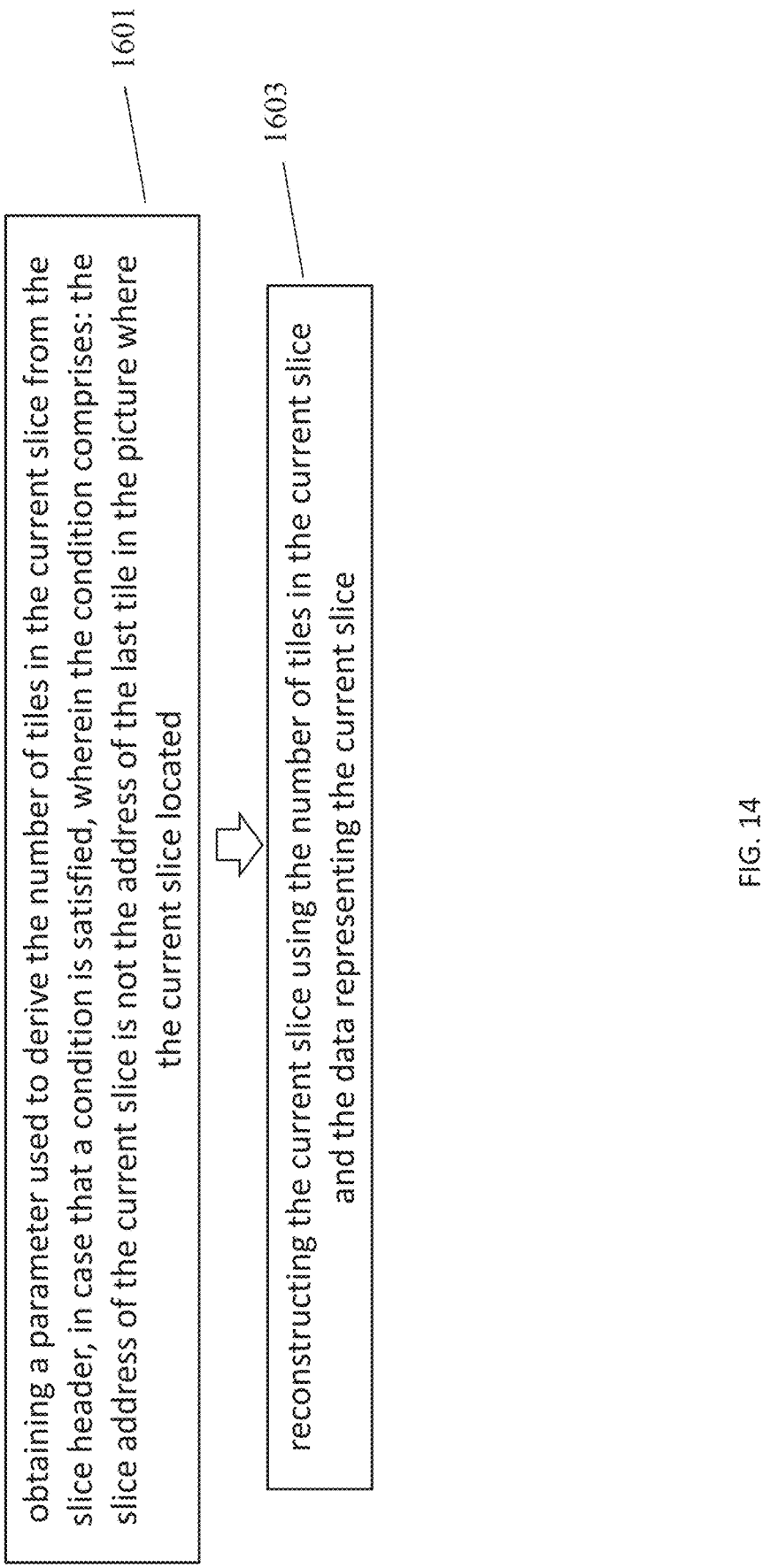
FIG. 14 illustrates a flowchart of a method for decoding of a video bitstream according to an embodiment of the present disclosure.

FIG. 14 illustrates a flowchart of a method for decoding of a video bitstream according to an embodiment of the present disclosure. The method illustrated in FIG. 14 is a method of decoding of a picture from a video bitstream implemented by a decoding device, the bitstream including a slice header of a current slice and data representing the current slice, the method comprising: obtaining (operation 1601) a parameter used to derive the number of tiles in the current slice from the slice header, in case that a condition is satisfied, wherein the condition comprises: the slice address of the current slice is not the address of the last tile in the picture where the current slice located; and reconstructing (operation 1603) the current slice using the number of tiles in the current slice and the data representing the current slice.

Figure 15:
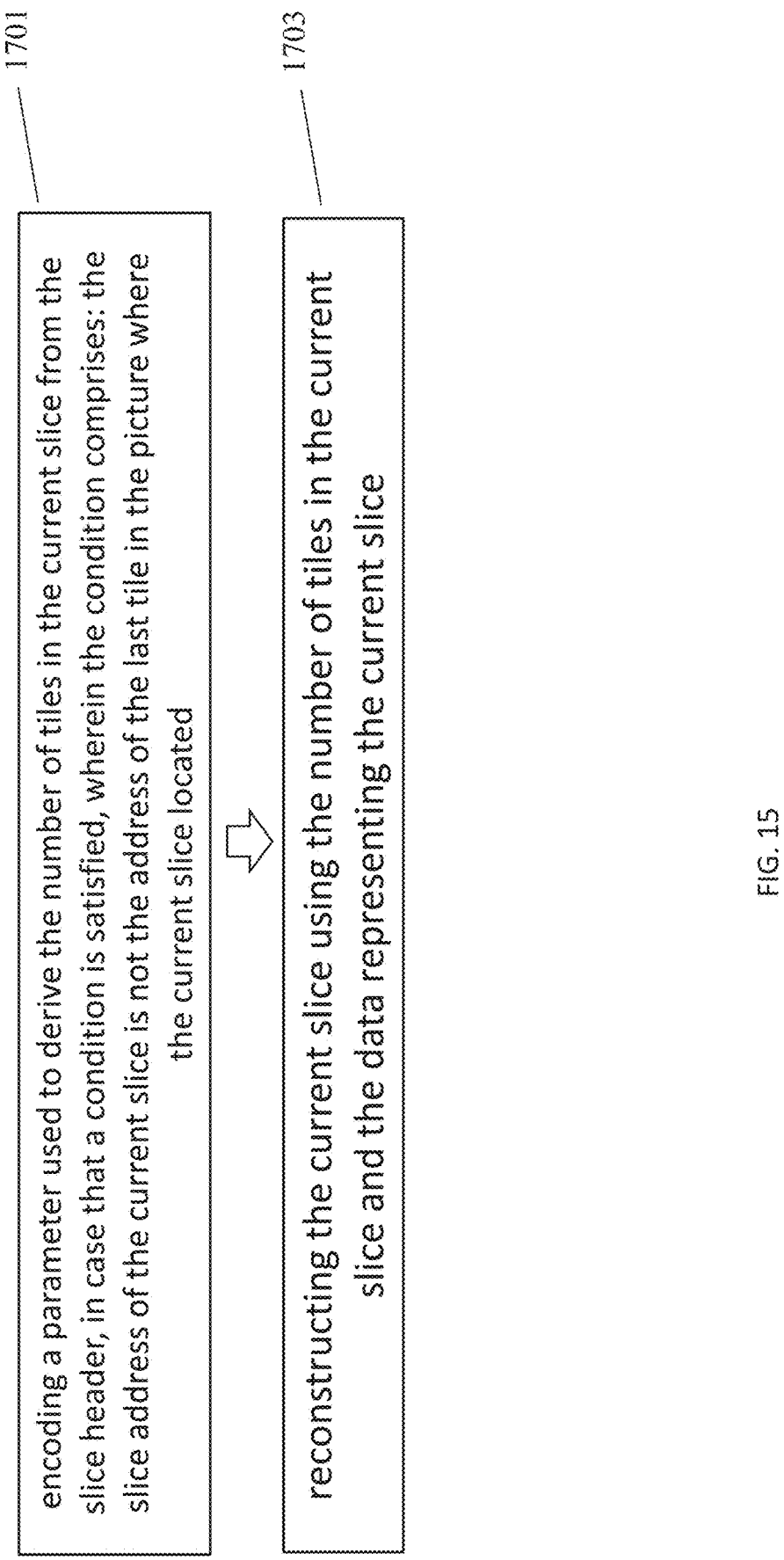
FIG. 15 illustrates a flowchart of a method for decoding of a video bitstream according to an embodiment of the present disclosure.

FIG. 15 illustrates a flowchart of another method for decoding of a video bitstream according to an embodiment of the present disclosure. The method illustrated in FIG. 15 is a method for encoding of a video bitstream implemented by an encoding device, the bitstream including a slice header of a current slice and data representing the current slice, the method comprising: encoding (operation 1701) a parameter used to derive the number of tiles in the current slice from the slice header, in case that a condition is satisfied, wherein the condition comprises: the slice address of the current slice is not the address of the last tile in the picture where the current slice located; reconstructing (operation 1703) the current slice using the number of tiles in the current slice and the data representing the current slice.

Figure 16:
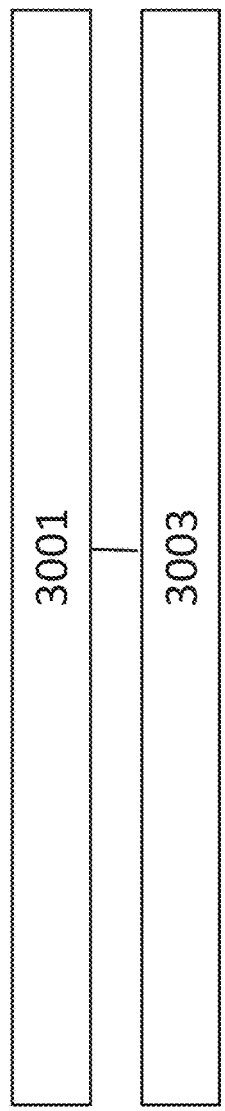
FIG. 16 illustrates a decoder for decoding of a video bitstream according to an embodiment of the present disclosure.

FIG. 16 illustrates an apparatus, i.e. a decoder (30), for decoding of a video bitstream according to an embodiment of the present disclosure. The apparatus illustrated in FIG. 16 is an apparatus (30) for decoding a picture from a video bitstream, the bitstream including a slice header of a current slice and data representing the current slice, the apparatus comprising: an obtaining unit (3001) configured to obtain a parameter used to derive the number of tiles in the current slice from the slice header, in case that a condition is satisfied, wherein the condition comprises: the slice address of the current slice is not the address of the last tile in the picture where the current slice located; a reconstructing unit (3003) configured to reconstruct the current slice using the number of tiles in the current slice and the data representing the current slice.

Figure 17:
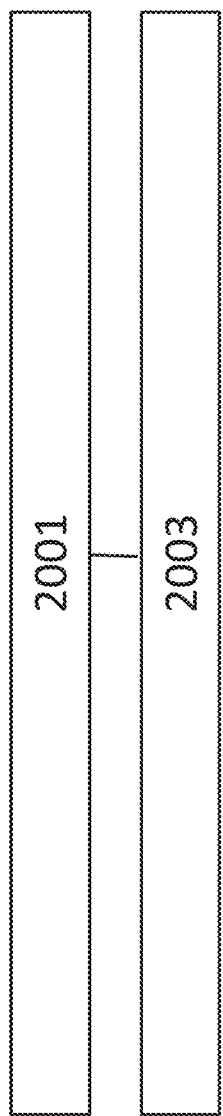
FIG. 17 illustrates an encoder for encoding of a video bitstream according to an embodiment of the present disclosure.

FIG. 17 illustrates an apparatus, i.e. an encoder (20), for encoding of a video bitstream according to an embodiment of the present disclosure. The apparatus illustrated in FIG. 17 is an apparatus (20) for encoding of a coded video bitstream, the bitstream including a slice header of a current slice and data representing the current slice, the apparatus comprising: an encoding unit (2001) configured to encode a parameter used to derive the number of tiles in the current slice from the slice header, in case that a condition is satisfied, wherein the condition comprises: the slice address of the current slice is not the address of the last tile in the picture where the current slice located; a reconstructing unit (2003) configured to reconstruct the current slice using the number of tiles in the current slice and the data representing the current slice.

Figure 12:
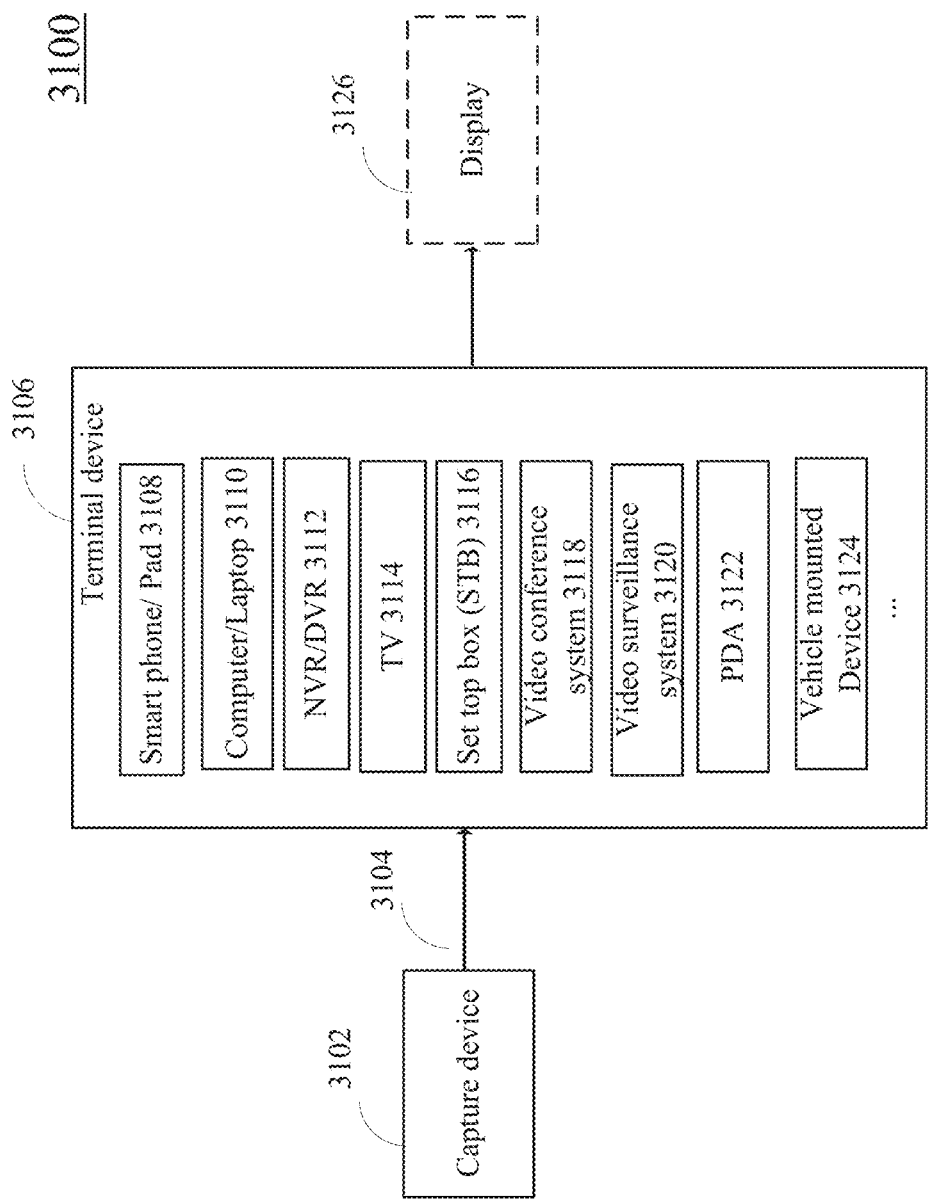
FIG. 12 is a block diagram showing an example structure of a content supply system 3100 which realizes a content delivery service.
Figure 13:
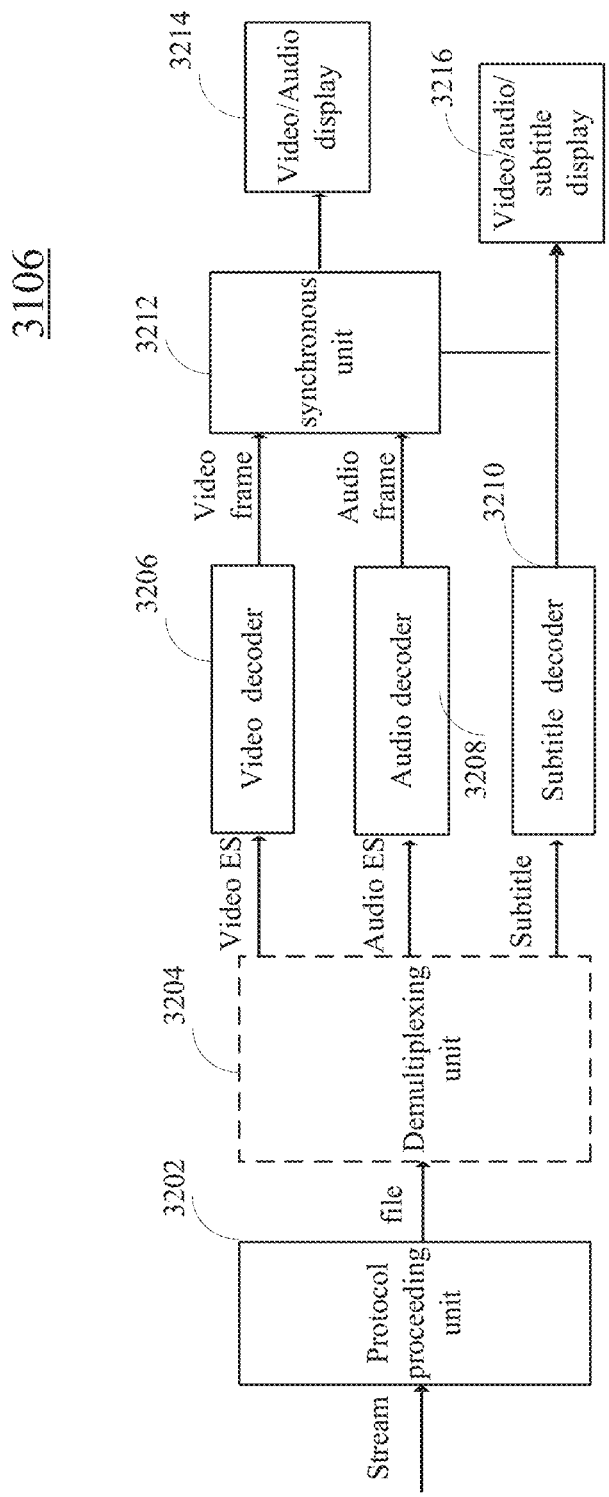
FIG. 13 is a block diagram showing a structure of an example of a terminal device.

The video decoding apparatus shown in FIG. 16 may be or may be comprised by the decoder 30 shown in FIGS. 1A, 1B, and 3 and the video decoder 3206 shown in FIG. 13. Moreover, the decoding apparatus may be comprised by the video coding device 400 shown in FIG. 4, the apparatus 500 shown in FIG. 5 and the terminal device 3106 shown in FIG. 12. The encoding apparatus shown in FIG. 17 may be or may be comprised by the encoder 20 shown in FIGS. 1A, 1B and 3. Further, the encoding apparatus may be comprised by the video coding device 400 shown in FIG. 4, the apparatus 500 shown in FIG. 5 and the capture device 3102 shown in FIG. 12.

The present disclosure discloses the following further figures. FIG. 12 is a block diagram showing a content supply system 3100 for realizing content distribution service. This content supply system 3100 includes capture device 3102, terminal device 3106, and may include display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

FIG. 13 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and subtitle may be generated. The video decoder 3206, which includes the video decoder 30 as explained in the above-mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 9) before feeding it to the synchronous unit 3212. Similarly, the audio frame may store in a buffer (not shown in FIG. 9) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, synchronizes it with the video frame and the audio frame, and supplies the video/audio/subtitle to a video/audio/subtitle display 3216.

The present application is not limited to the above-mentioned system, and either the picture encoding device or the picture decoding device in the above-mentioned embodiments can be incorporated into other system, for example, a car system.

Mathematical Operators

The mathematical operators used in this disclosure are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
\* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y. 1=x Modulus. Remainder of x divided by y, defined only for integers x and y with x>=0 x % y and y>0.

Logical Operators

The following logical operators are defined as follows:
x && y Boolean logical "and" of x and y
x||y Boolean logical "or" of x and y
! Boolean logical "not"
x ? y: z If x is TRUE or not equal to 0, evaluates to the value of y; otherwise, evaluates to the value of z.

Relational Operators

The following relational operators are defined as follows:
\> Greater than
\>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
= Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Range Notation

The following notation is used to specify a range of values:
x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0\ \&\&\ y >= 0 \\ \text{Atan}\left(\frac{t}{x}\right) - \pi; & x < 0\ \&\&\ y < 0 \\ +\frac{\pi}{2}; & x == 0\ \&\&\ y >= 0 \\ -\frac{\pi}{2}; & \text{otherwise} \end{cases}$$

Ceil(x) the smallest integer greater than or equal to x.

$$\text{Clip1}_Y(x) = \text{Clip3}(0, (1 << \text{BitDepth}_Y) - 1, x)$$

$$\text{Clip1}_C(x) = \text{Clip3}(0, (1 << \text{BitDepth}_C) - 1, x)$$

$$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\text{GetCurrMsb}(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281828 . . . ).

Log 2(x) the base-2 logarithm of x.

Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

$$\text{Round}(x) = \text{Sign}(x) * \text{Floor}(\text{Abs}(x) + 0.5)$$

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians $$\text{Sqrt}(x) = \sqrt{x}$$

$$\text{Swap}(x, y) = (y, x)$$

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

Table: Operation precedence from highest (at top of table) to lowest (at bottom of table)

TABLE

Operation precedence from highest (at top of table) to lowest (at bottom of table)

| operations (with operands x, y, and z) |
| --- |
| "x++", "x— —" |
| "!x", "-x"(as a unary prefix operator) |
| $x^y$ |
| "x * y", "x/y", "x ÷ y", "$\frac{x}{y}$", "x % y" |
| "x + y", "x − y"(as a two-argument operator), |
| $"\sum_{i=x}^{y} f(i)"$ |
| "x << y", "x >> y" |
| "x < y", "x <= y", "x > y", "x >= y" |
| "x == y", "x != y" |
| "x & y" |
| "x \| y" |
| "x && y" |
| "x \|\| y" |
| "x ? y:z" |
| "x...y" |
| "x = y", "x += y", "x −= y" |

Text Description of Logical Operations

In the text, a statement of logical operations as would be described mathematically in the following form:

if(condition 0)
statement 0
else if(condition 1)
statement 1
. . .
else /* informative remark on remaining condition */
statement n may be described in the following manner:

. . . as follows / . . . the following applies:
If condition 0, statement 0
Otherwise, if condition 1, statement 1
. . .
Otherwise (informative remark on remaining condition), statement n Each "If . . . Otherwise, if . . . Otherwise, . . . "statement in the text is introduced with" . . . as follows" or " . . . the following applies" immediately followed by "If . . . ". The last condition of the "If . . . Otherwise, if . . . Otherwise, . . . " is always an "Otherwise . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

if(condition 0a && condition 0b)
statement 0
else if(condition 1a|condition 1b)
statement 1
. . .
else
statement n may be described in the following manner:
```
... as follows/ ... the following applies:
   If all of the following conditions are true, statement 0:
      condition 0a
      condition 0b
   Otherwise, if one or more of the following conditions are true, statement 1:
      condition 1a
      condition 1b
   ...
   Otherwise, statement n
```
In the text, a statement of logical operations as would be described mathematically in the following form:
```
if(condition 0)
   statement 0
if(condition 1)
   statement 1
```
may be described in the following manner:
```
When condition 0, statement 0
When condition 1, statement 1.
```

Although embodiments of the application have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The present disclosure discloses the following twenty-one further aspects.

1. An aspect of a method of decoding of a video or picture bitstream implemented by a decoding device, wherein the bitstream including data representing a current slice, the method comprising: obtaining the slice address of the current slice from a slice header of the bitstream on condition that a presence condition is satisfied, wherein the presence condition comprises the picture header syntax structure is not present in the slice header; reconstructing the current slice based on the slice address of the current slice.

2. An aspect of a method of aspect 1, wherein the picture header syntax structure is not present in the slice header comprises a syntax element is equal to false, wherein the syntax element equal to false specifies that the picture header syntax structure is not present in the slice header.

3. An aspect of a method of aspects 1 or 2, wherein the value of the slice address of the current slice is inferred to be equal to zero when the presence condition is not satisfied.

4. An aspect of a method of decoding of a video or picture bitstream implemented by a decoding device, wherein the bitstream including data representing a current slice, the method comprising: obtaining a parameter used to derive the number of tiles in the current slice from a slice header of the bitstream on condition that a presence condition is satisfied, wherein the presence condition comprises the picture header syntax structure is not present in the slice header; reconstructing the current slice based on the number of tiles in the current slice.

5. An aspect of a method of aspect 4, wherein the picture header syntax structure is not present in the slice header comprises a syntax element is equal to false, wherein the syntax element equal to false specifies that the picture header syntax structure is not present in the slice header.

6. An aspect of a method of aspects 4 or 5, wherein the value of the parameter of the current slice is inferred to be equal to total number of tiles in the picture where the current slice minus 1 when the presence condition is not satisfied.

7. An aspect of a method of decoding of a video or picture bitstream implemented by a decoding device, wherein the bitstream including data representing a current slice, the method comprising: obtaining a parameter used to derive the number of tiles in the current slice from a slice header of the bitstream on condition that a presence condition is satisfied, wherein the presence condition comprises the slice address of the current slice is not the address of the last tile in the picture where the current slice located; reconstructing the current slice based on the number of tiles in the current slice.

8. An aspect of a method of aspect 7, wherein the slice address of the current slice is the address of the last tile in the picture comprises the number of tiles in the picture minus the slice address of the current slice is equal to 1.

9. An aspect of a method of aspects 7 or 8, wherein the value of the parameter of the current slice is inferred to be equal a default value when the presence condition is not satisfied.

10. An aspect of a method of aspect 9, wherein the default value is equal to 0.

11. An aspect of a method of decoding of a video or picture bitstream implemented by a decoding device, wherein the bitstream including data representing a current slice, the method comprising: obtaining a parameter used to derive the number of tiles in the current slice from a slice header of the bitstream on condition that a presence condition is satisfied, wherein the presence condition comprises the slice address of the current slice is not the address of the last tile in the picture where the current slice located and the picture header syntax structure is not present in the slice header; reconstructing the current slice based on the number of tiles in the current slice.

12. An aspect of a method of aspect 11, wherein the value of the parameter is inferred to be equal to a first default value when the slice address of the current slice is the address of the last tile in the picture or a second default value the picture header syntax structure is present in the slice header.

13. An aspect of a method of of decoding of a video or picture bitstream implemented by a decoding device, wherein the bitstream including data representing a current slice, the method comprising: obtaining a parameter (such as slice_lmcs_enabled_flag) used to specify whether luma mapping with chroma scaling is enabled for the current slice from a slice header of the bitstream, on condition that a presence condition is satisfied, wherein the presence condition comprises the picture header syntax structure is not present in the slice header; reconstructing the current slice based on the number of tiles in the parameter.

14. An aspect of a method of aspect 13, wherein the picture header syntax structure is not present in the slice header comprises a syntax element is equal to false, wherein the syntax element equal to false specifies that the picture header syntax structure is not present in the slice header.

15. An aspect of a method of encoding of a video or picture into a bitstream implemented by an encoding device, wherein the bitstream including data representing a current slice, the method comprising: including in the bitstream the slice address of the current slice from a slice header of the bitstream on condition that a presence condition is satisfied, wherein the presence condition comprises the picture header syntax structure is not present in the slice header; reconstructing the current slice based on the slice address of the current slice.

16. An aspect of a decoder (30) comprising processing circuitry for carrying out the method according to any one of aspects 1 to 15.

17. An aspect of a computer program product comprising a program code for performing the method according to any one of the preceding aspects when executed on a computer or a processor.

18. An aspect of a decoder, comprising:
one or more processors; and a non-transitory computer-readable storage medium coupled to the processors and storing programming for execution by the processors, wherein the programming, when executed by the processors, configures the decoder to carry out the method according to any one of the preceding aspects 1 to 15.

19. An aspect of a non-transitory computer-readable medium carrying a program code which, when executed by a computer device, causes the computer device to perform the method of any one of the preceding aspects 1 to 15.

20. An aspect of an encoded bitstream for the video signal by including a plurality of syntax elements, wherein the plurality of syntax elements comprises picture_header_in_slice_header_flag, and wherein a flag (such as slice_lmcs_enabled_flag) is conditionally signaled in the slice header at least based on a value of picture_header_in_slice_header_flag.

21. An aspect of a non-transitory recording medium which includes an encoded bitstream decoded by an image decoding device, the bit stream being generated by dividing a frame of a video signal or an image signal into a plurality blocks, and including a plurality of syntax elements, wherein the plurality of syntax elements comprises rect_slice_flag or sps_num_subpics_minus1, and wherein a flag (such as slice_lmcs_enabled_flag) is conditionally signaled in the slice header at least based on a value of picture_header_in_slice_header_flag.

What is claimed is:

1. A method of decoding a picture from a video bitstream implemented in a decoding apparatus, the video bitstream including a slice header of a current slice and data representing the current slice, the method comprising:
obtaining, by a processor of the decoding apparatus, a parameter used to derive a number of tiles in the current slice from the slice header when a number of tiles in the picture minus a slice address of the current slice is greater than 1; and
reconstructing, by the processor, the current slice using the number of tiles in the current slice and the data representing the current slice.

2. The method of claim 1, further comprising:
when the slice address of the current slice is the address of the last tile in the picture, determining, by the processor, that the number of tiles in the picture minus the slice address of the current slice is equal to 1.

3. The method according to claim 1, wherein a value of the parameter is equal to a default value when the slice address of the current slice is the address of the last tile in the picture.

4. The method according to claim 3, wherein the default value is equal to 0.

5. The method according to claim 1, wherein the slice address is in unit of tile.

6. The method according to claim 1, wherein reconstructing, by the processor, the current slice using the number of tiles in the current slice comprises:
determining, by the processor, a scan order of coding tree units in the current slice using the number of tiles in the current slice; and
reconstructing, by the processor, the coding tree units in the current slice using the scan order.

7. A method of encoding a picture into a video bitstream implemented in an encoding apparatus, the video bitstream including a slice header of a current slice and data representing the current slice, the method comprising:
encoding, by a processor of the encoding apparatus, a parameter used to derive a number of tiles in the current slice from the slice header when a number of tiles in the picture minus a slice address of the current slice is greater than 1; and
reconstructing, by the processor, the current slice using the number of tiles in the current slice and the data representing the current slice.

8. A decoding apparatus for decoding a picture from a video bitstream, the video bitstream including a slice header of a current slice and data representing the current slice, the decoding apparatus comprising:
a processor coupled to a memory that stores instructions, which when executed by the processor, cause the decoding apparatus to:
obtain a parameter used to derive a number of tiles in the current slice from the slice header when a number of tiles in the picture minus a slice address of the current slice is greater than 1; and
reconstruct the current slice using the number of tiles in the current slice and the data representing the current slice.

9. An encoding apparatus for encoding a picture into a coded video bitstream, the coded video bitstream including a slice header of a current slice and data representing the current slice, the encoding apparatus comprising:
a processor coupled to a memory that stores instructions, which when executed by the processor, cause the encoding apparatus to:
encode a parameter used to derive a number of tiles in the current slice from the slice header when a number of tiles in the picture minus a slice address of the current slice is greater than 1; and
reconstruct the current slice using the number of tiles in the current slice and the data representing the current slice.

10. A non-transitory computer-readable storage medium storing
a video bitstream that is generated by a method performed by an encoding apparatus, the video bitstream comprises a slice header of a current slice and data representing the current slice, wherein the slice header comprises a slice address of the current slice;
wherein when a number of tiles in a picture minus a slice address of the current slice is greater than 1, the slice header further comprises a parameter used to derive a number of tiles in the current slice.

11. The method of claim 7, further comprising:
when the slice address of the current slice is an address of a last tile in the picture, determining, by the processor, that the number of tiles in the picture minus the slice address of the current slice is equal to 1.

12. The method according to claim 7, wherein a value of the parameter used to derive the number of tiles in the current slice from the slice header is equal to a default value when the slice address of the current slice is an address of a last tile in the picture.

13. The method according to claim 12, wherein the default value is equal to 0.

14. The method according to claim 7, wherein the slice address of the current slice is in unit of tile.

15. The method according to claim 7, wherein reconstructing the current slice using the number of tiles in the current slice comprises:
determining, by the processor, a scan order of coding tree units in the current slice using the number of tiles in the current slice; and
reconstructing, by the processor, the coding tree units in the current slice using the scan order.

* * * * *